(12) United States Patent
Mori

(10) Patent No.: US 9,633,291 B2
(45) Date of Patent: *Apr. 25, 2017

(54) METHOD AND SYSTEM FOR CONFIGURING NETWORK PRINTERS

(71) Applicant: Seiko Epson Corporation, Tokyo (JP)

(72) Inventor: Keigo Mori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,090

(22) Filed: Feb. 11, 2016

(65) Prior Publication Data

US 2016/0162764 A1    Jun. 9, 2016

Related U.S. Application Data

(63) Continuation of application No. 14/592,192, filed on Jan. 8, 2015, now Pat. No. 9,280,304.

(30) Foreign Application Priority Data

Jan. 8, 2014   (JP) .................................. 2014-001434

(51) Int. Cl.
  *G06F 15/00*     (2006.01)
  *G06F 3/12*      (2006.01)
  *G06K 1/00*      (2006.01)
  *G06K 15/00*     (2006.01)

(52) U.S. Cl.
  CPC ......... *G06K 15/402* (2013.01); *G06F 3/1204* (2013.01); *G06F 3/1205* (2013.01); *G06F 3/129* (2013.01); *G06F 3/1228* (2013.01); *G06F 3/1258* (2013.01); *G06F 3/1291* (2013.01); *G06F 3/1288* (2013.01)

(58) Field of Classification Search
  CPC ... G06K 15/402; G06F 3/1204; G06F 3/1205; G06F 3/1228; G06F 3/1258; G06F 3/129; G06F 3/1291; G06F 3/1288
  USPC ............................... 358/1.1, 1.13, 1.15, 1.14
  See application file for complete search history.

(56) References Cited

U.S. PATENT DOCUMENTS

| | | | |
|---|---|---|---|
| 8,228,537 B2 | 7/2012 | Uehara | |
| 8,289,542 B2 | 10/2012 | Mukund et al. | |
| 2007/0204045 A1 | 8/2007 | Shima | |

(Continued)

FOREIGN PATENT DOCUMENTS

| | | |
|---|---|---|
| JP | 2006-039915 A | 2/2006 |
| JP | 2009-064177 A | 3/2009 |

(Continued)

*Primary Examiner* — Douglas Tran
(74) *Attorney, Agent, or Firm* — Nutter McClennen & Fish LLP; John J. Penny, Jr.

(57) ABSTRACT

A print control system includes one or more first printers each having a print unit that can print on print media, a second printer that communicates with the first printers via a first network and has a print unit that can print on print media, and a print control server that connects to the second printer through a second network. The control print server sends, to the second printer, configuration control data containing attribute information that can be used to identify one of the first printers. The second printer forwards the configuration control data to the identified first printer and the identified first printer executes a configuration process in response to the configuration control data.

6 Claims, 12 Drawing Sheets

(56) References Cited

U.S. PATENT DOCUMENTS

2012/0133974 A1   5/2012   Nakamura
2015/0193175 A1   7/2015   Mori

FOREIGN PATENT DOCUMENTS

JP   2011-108097 A   6/2011
JP   2012-113733 A   6/2012

METHOD AND SYSTEM FOR CONFIGURING NETWORK PRINTERS

RELATED APPLICATIONS

The present application is a Continuation of U.S. patent application Ser. No. 14/592,192, filed on Jan. 8, 2015, which claims the benefit and priority, under 35 U.S.C. §119 to Japanese Patent Application No. 2014-001434, filed on Jan. 8, 2014. The entire teachings of these applications are incorporated by reference herein.

Priority is claimed under 35 U.S.C. §119 to Japanese Application no. 2014-001434 filed on Jan. 8, 2014 which is hereby incorporated by reference in their entirety.

BACKGROUND

1. Technical Field

The present disclosure relates to a print control system that includes a printing device, and to a print control method.

2. Related Art

A print control system that prints on print media and produces receipts by a printing device as controlled by a print control device is described, for example, in JP-A-2011-108097. This type of print control system includes systems in which the printing device and a print control server functioning as a print control device communicate through a network.

When building a system in which a printing device (referred to below as a "second printer") and the print control server communicate over a network (referred to below as a "second network") as in the print control system described above, and connecting another printing device (referred to below as a "first printer") to the second printer through a different network such as a LAN or other network (referred to below as as a "first network"), there is a need to control the printing-related settings of the first printer from the print control server using a configuration enabling the second printer and the print control server to communicate through the second network, and a configuration enabling the first printer and the second printer to communicate through the first network. This would eliminate the need for the user to directly and individually configure the first printer connected to the first network, thereby improving user convenience and ease of maintenance.

SUMMARY

An objective of the present invention is therefore to enable configuring specific printing related settings on a first printer of specific attributes by a print control server in a system in which a second printer and print control server communicate through a second network, and the second printer and the first printer communicate through a first network, by using the construction enabling the second printer and the print control server to communicate through the second network, and the construction enabling the second printer and the first printer to communicate through the first network.

To achieve this objective, a print control server according to one aspect of the invention has a first printer; a second printer that communicates with the first printer through a first network; and a print control server that connects to the second printer through a second network, and sends configuration control data including attribute information identifying an attribute of the first printer and causing the first printer to execute a configuration process to the second printer.

Thus comprised, the print control server sends configuration control data including attribute information identifying an attribute of the first printer and causing the first printer to execute a configuration process to the second printer. Based on the attribute information contained in the configuration control data, the second printer can control the first printer matching the attribute information to execute a configuration process based on the configuration control data. Using a construction enabling the second printer and the print control server to communicate over a second network, and a construction enabling the second printer and the first printer to communicate over a first network, the print control server can therefore cause a printer matching a specific attribute to execute a configuration process.

In a print control server according to another aspect of the invention, the second printer sends the configuration control data to the first printer based on the attribute information contained in the configuration control data when the second printer receives the configuration control data; and the first printer executes the configuration process based on the received configuration control data.

Thus comprised, the second printer sends the configuration control data to the first printer matching the attribute information based on the attribute information contained in the received configuration control data, and can cause the first printer to execute a configuration process.

In a print control server according to another aspect of the invention, the second printer queries the first printer for the attribute information, and based on the response to the query, selects the first printer to which to send the configuration control data.

Thus comprised, the second printer can select a particular first printer corresponding to the attribute information specified by the print control server from among a group of first printers connected to the first network.

In a print control server according to another aspect of the invention, the first printer sends unique information uniquely assigned to the first printer to the second printer after completing the configuration process based on the received configuration control data; the second printer stores and sends the received unique information of the first printer to the print control server; and the print control server relationally stores the received unique information of the first printer with information related to a setting made in the configuration process.

Thus comprised, the print control server can manage the first printers connected to the first network using the unique information, and to execute a process on any one first printer, use the unique information to specify the one first printer that is to execute the process. Based on the unique information, the print control server can also manage information related to the configuration of the first printer.

In a print control server according to another aspect of the invention, when sending control data causing the first printer of the stored unique information to execute a process, the print control server adds the unique information to the control data and then sends the control data to the second printer.

Thus comprised, the print control server can use the unique information to execute a process on a specific first printer selected from the plural first printers connected to the first network.

In a print control server according to another aspect of the invention, when the configuration process ends, the first printer prints information indicating the content of a setting made in the configuration process.

Thus comprised, the user can know which first printers have been configured as controlled by the print control server, and can know the content of the settings that were set in the first printer, by referring to the printout from the first printer.

Another aspect of the invention is a print control method including steps of: a print control server generating configuration control data causing a first printer connected through a first network to a second printer to execute a configuration process; sending the generated configuration control data to a second printer connected through a second network to the print control server; the second printer sending the configuration control data through the first network to the first printer; and the first printer executing a configuration process based on the configuration control data.

Thus comprised, the print control server can control a first printer through a second printer to execute a configuration process. Using a construction enabling the second printer and the print control server to communicate over a second network, and a construction enabling the second printer and the first printer to communicate over a first network, the print control server can therefore cause a printer matching a specific attribute to execute a configuration process.

In a print control method according to another aspect of the invention, the configuration control data includes attribute information; the second printer sends the configuration control data to the first printer based on the attribute information contained in the configuration control data when the second printer receives the configuration control data; and the first printer executes the configuration process based on the received configuration control data.

Thus comprised, the second printer sends the configuration control data to the first printer matching the attribute information based on the attribute information contained in the received configuration control data, and can cause the first printer to execute a configuration process.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
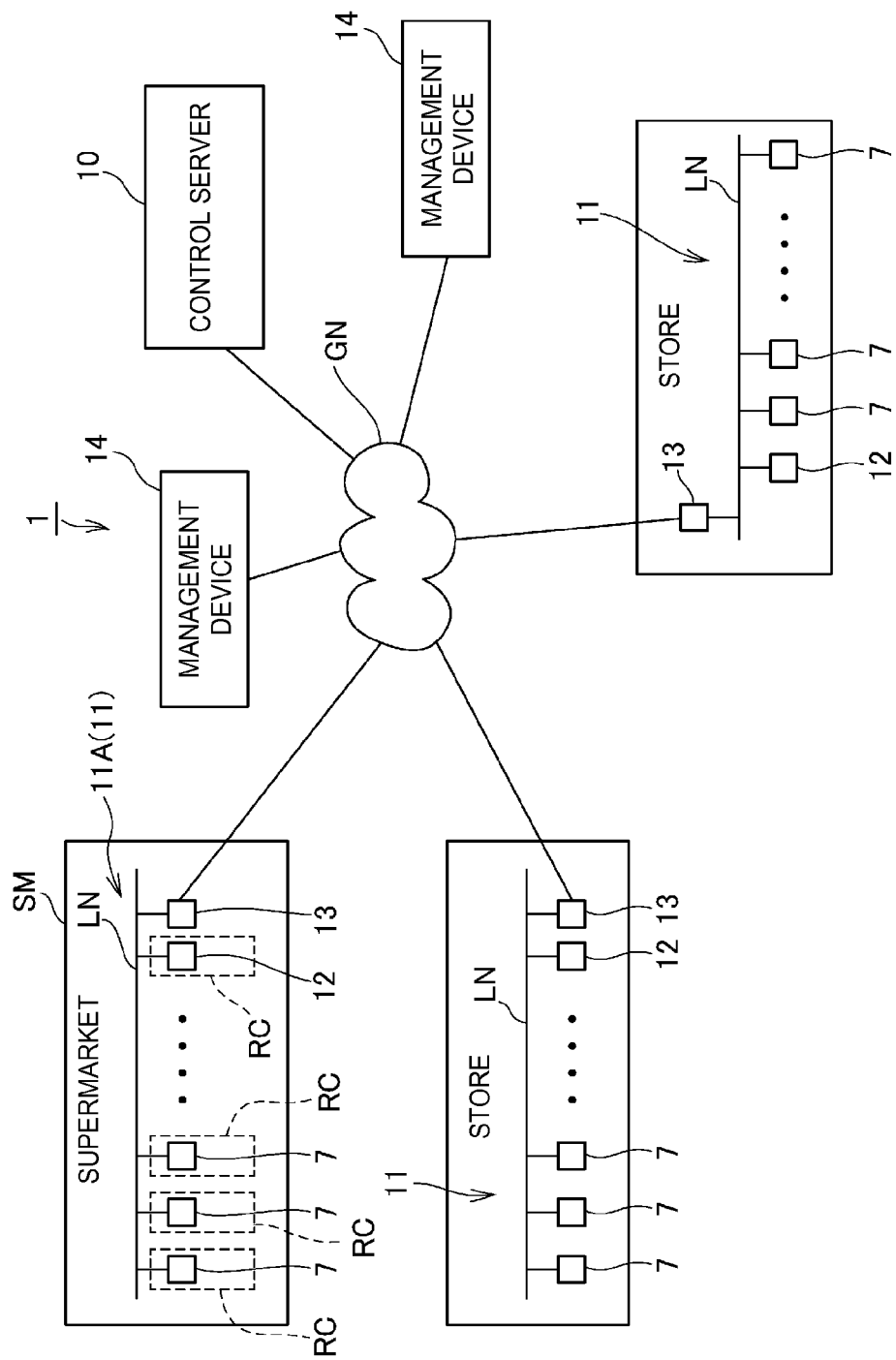
FIG. 1 shows the configuration of a print control system according to an embodiment of the invention.

FIG. 1 shows the configuration of a print control system 1 according to a preferred embodiment of the invention.

As shown in FIG. 1, the print control system 1 includes a control server 10 (print control server). The control server 10 connects to a plurality of store systems 11 through the Internet or other network GN (second network). Plural management devices 14 are also connected to the network GN.

The store system 11 is a system that is used in retail businesses such as supermarkets, convenience stores, department stores, and restaurants. The store system 11 has the ability to produce receipts for customers of the business.

The store system 11 has a master printer 12 (second printer) and one or more printers 7 (first printers). The master printer 12 and printers 7 each have a printing function for printing on print media and can produce receipts. The master printer 12 and printers 7 connect to a local area network LN (first network) deployed in the store.

A network communication controller 13 configured with a communication device such as a network router or modem connects to the local area network LN. The master printer 12 can access the network GN through the network communication controller 13. The printers 7 can communicate with the master printer 12 through the local area network LN.

In the example shown in FIG. 1, the store system 11A is a system used in a supermarket SM. Plural checkout counters RC are set up in the supermarket SM, and a master printer 12 or slave printer 7 is installed at each checkout counter RC. The master printer 12 of the store system 11A connect to the local area network LN, and access the network GN through the network communication controller 13.

In the print control system 1 according to this embodiment of the invention the master printer 12 of the store system 11 establishes a communication connection with the control server 10, and communicates with the control server 10. The master printer 12 executes printing-related processes, processes controlling printing by the master printer 12, and processes for relaying data to the slave printer 7, as controlled by the control server 10.

The management device 14 is a device that manages one or more store systems 11. For example, the management device 14 may be installed in the headquarters of a company that operates multiple stores, and manage the store systems 11 deployed in one or more stores associated with the corporate group. As described below, the management device 14 controls a specific master printer 12 or a specific slave printer 7 in the store system 11 the management device 14 manages, and can control printing by the specific master printer 12 or the specific slave printer 7.

Figure 2:
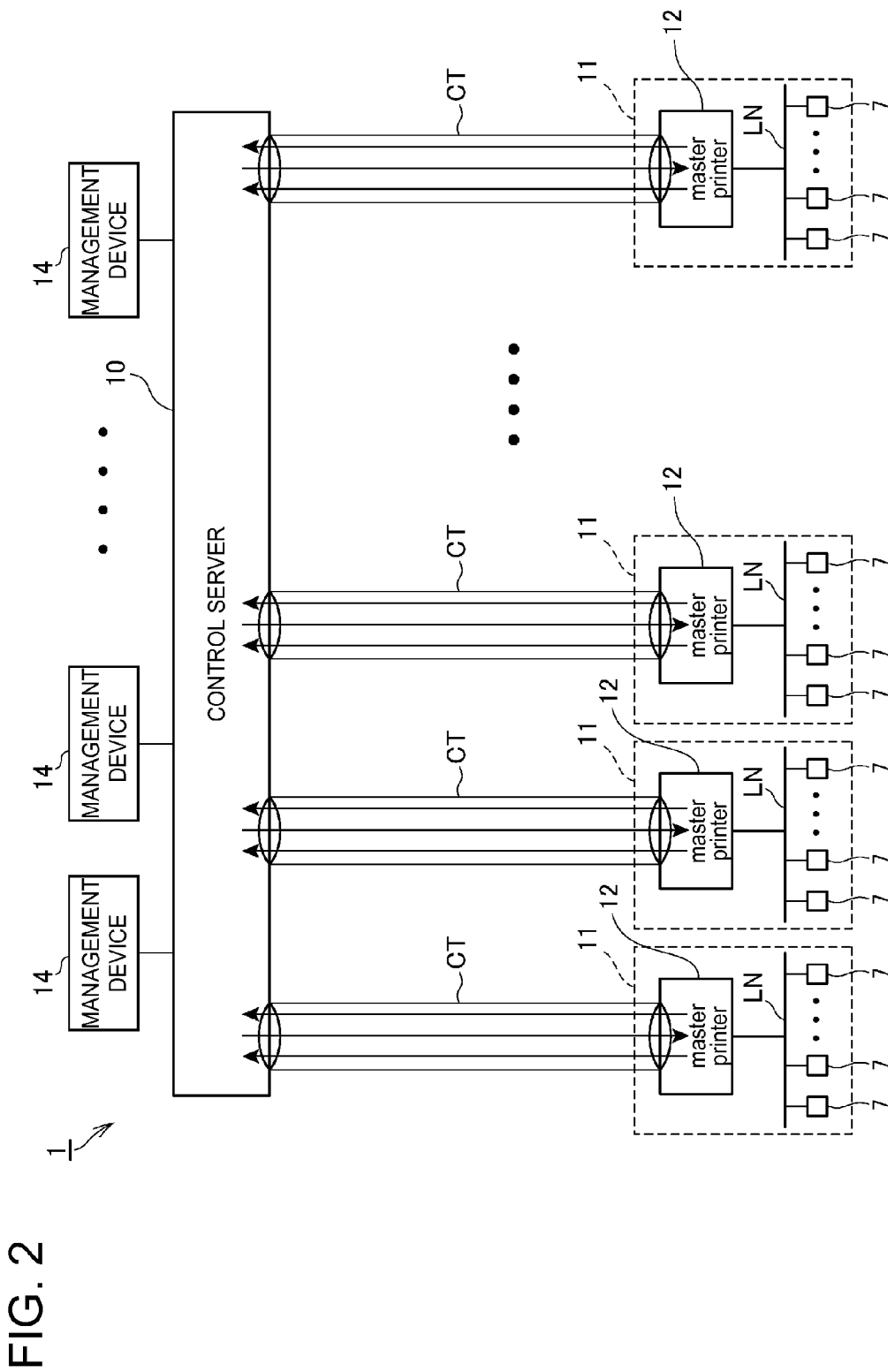
FIG. 2 illustrates the relationships between devices in the print control system.

FIG. 2 illustrates the communication paths established between the control server 10, master printers 12, slave printers 7, and management devices 14 in the print control system 1.

As shown in FIG. 2, a WebSocket connection CT (communication path) enabling WebSocket communication is established in the print control system 1 between the control server 10 and the master printers 12 in each store system 11.

WebSocket is a communication standard that enables asynchronous duplex communication. After a server and client open a WebSocket connection CT using the WebSocket standard, sending and receiving data between the devices uses the WebSocket protocol by means of the connection. It is therefore not necessary to establish a connection every time data is transmitted.

The WebSocket connection CT is a logical communication path for sending and receiving data according to the WebSocket standard and procedures between the master printer 12 and control server 10 connected through the WebSocket connection CT. Therefore, once the master printer 12 and control server 10 handshake and establish a WebSocket connection CT, the master printer 12 and control server 10 can exchange data asynchronously over the WebSocket connection CT. More specifically, the control server 10 can send data to the master printer 12 through the WebSocket connection CT at any time, and the master printer 12 can send data to the control server 10 at the desired time through the WebSocket connection CT.

WebSocket communication is asynchronous, duplex communication between the master printer 12 and control server 10 through the WebSocket connection CT based on the WebSocket protocol and methods.

By establishing a WebSocket connection CT, the master printer 12 and the control server 10 can communicate by asynchronous, duplex communication. The control server 10 can push data to the master printer 12 at the desired time by WebSocket communication through the WebSocket connection CT without receiving a request from the master printer 12 operating as a client device. Likewise, the master printer 12 can push data to the control server 10 through the WebSocket connection CT at any time.

The control server 10 is also communicatively connected to the plural management devices 14. As described below, a management device 14 sends print control data to a specific master printer 12 through the control server 10, and can control printing by the specific master printer 12. The management device 14 can also send print control data to a specific slave printer 7 through the control server 10 and a master printer 12, and can control printing by the specific slave printer 7.

As also shown in FIG. 2, a plurality of slave printers 7 are also communicatively connected through the local area network LN to a master printer 12.

In this embodiment of the invention the control server 10 is a client server in a so-called cloud system in which the master printers 12 are client devices. More particularly, the control server 10 can process data, execute specific processes when triggered by receiving a request from the master printer 12 or a request from the management device 14, and when specific conditions are met, and send data based on the result of the process through the WebSocket connection CT to the master printer 12.

In FIG. 2 the control server 10 is represented as a single block, but this does not mean that the control server 10 is configured from a single server. For example, the control server 10 may be configured from multiple servers, or it may be a server rendered by a function of a specific system. More specifically, the control server 10 may be any configuration that can execute the processes described herein.

The control server 10 and master printer 12 communicate according to the WebSocket communication protocol in this embodiment. The invention is not limited to WebSocket communication, however, and other configurations enabling devices to communicate by asynchronous, duplex communication similarly to WebSocket communication may be used.

The print control system 1 thus has multiple (such as a 1000) master printers 12 each capable of printing communicatively connected through a WebSocket connection CT to a control server 10.

Such a configuration enables the following.

The control server 10 can collect, manage, and analyze information based on data received from the plural master printers 12 connected to plural store systems 11. The control server 10 can therefore accumulate valuable information. The collected information can be used as so-called "big data."

Constructing a store system 11 can also be made easier and less expensive. More specifically, the master printer 12 is connected to the control server 10 by a WebSocket connection CT in this print control system 1. Using a service provided by the control server 10, this enables controlling the master printers 12 to execute specific processes as controlled by the control server 10. These specific processes include printing by a master printer 12, controlling printing by the slave printer 7, relaying data sent to the slave printer 7, and relaying data sent from the slave printer 7.

An administrator constructing a store system 11 can therefore build the store system 11 by simply installing the master printers 12 where desired, then connecting the master printers 12 to the network GN, and connecting the master printers 12 and slave printers 7 to the local area network LN. This enables controlling the master printers 12 to execute a desired process, such as a process related to producing receipts, using a service provided by the control server 10. Ease of installation can also be improved and the cost reduced for the management device 14.

The administrator configuring the store system 11 therefore does not need to embed a function for controlling the master printers 12 in the management device 14 that manages the one or more store systems 11. More specifically, by accessing the control server 10 and using a service provided by the control server 10, the management device 14 can control the master printers 12 connected to the control server 10, and the slave printers 7 connected through the local area network LN to a master printer 12. Configuring the store system 11 can therefore be simplified, and cost can be reduced.

Figure 3:
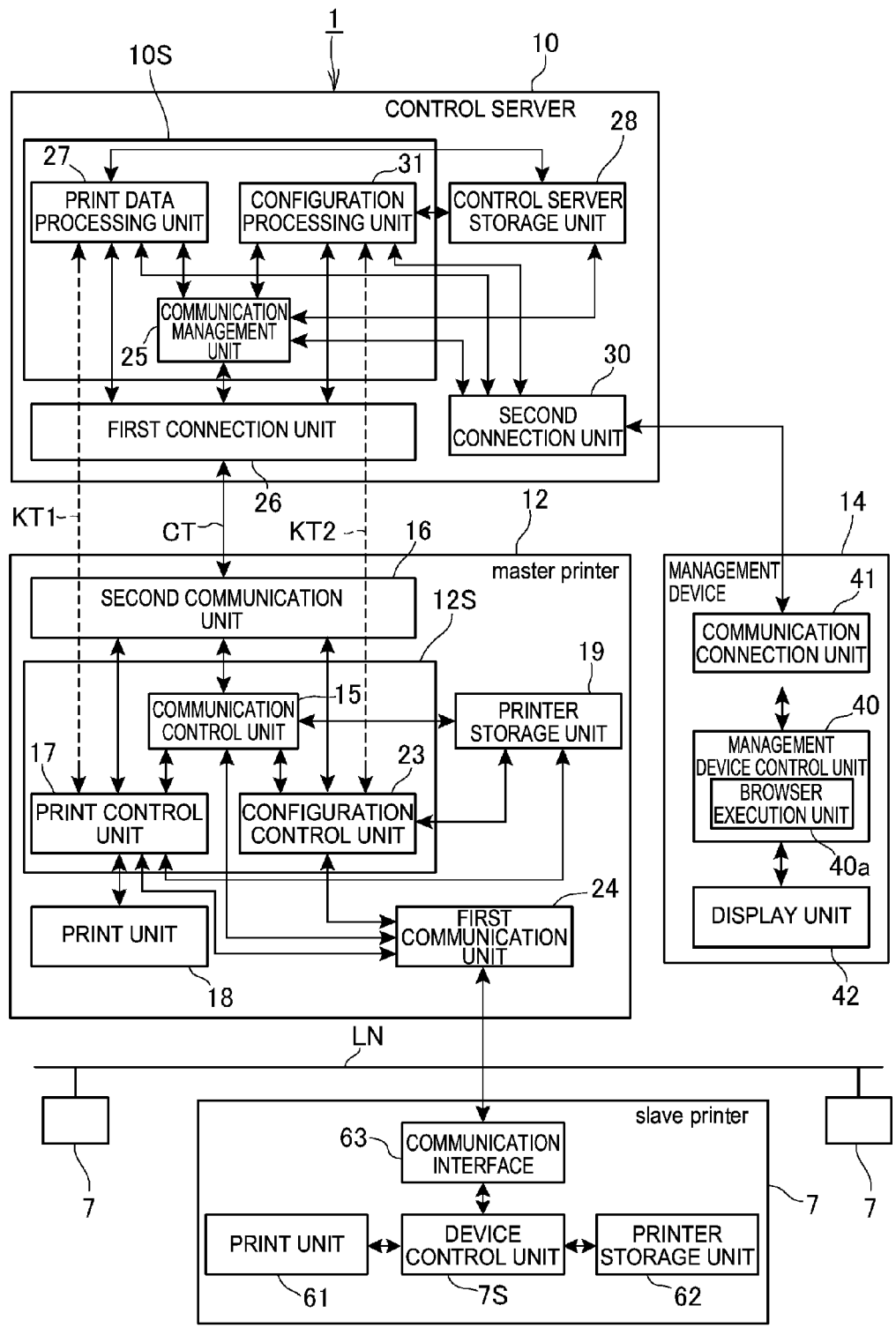
FIG. 3 is a block diagram showing the functional configuration of devices in the print control system.

FIG. 3 is a block diagram showing the functional configuration of a master printer 12, a slave printer 7, the control server 10, and the management device 14.

As shown in FIG. 3, the master printer 12 includes a device control unit 12S, a second communication unit 16, a print unit 18 (second print unit), a printer storage unit 19, and a first communication unit 24.

The device control unit 12S includes a CPU, ROM, RAM, and other peripheral circuits, and controls the master printer 12. Function blocks of the device control unit 12S include a communication control unit 15, a print control unit 17, and a configuration control unit 23. These function blocks are described further below.

The print unit 18 includes a print mechanism that prints on print media, a conveyance mechanism that conveys the print media, and a cutter mechanism that cuts the print media, and a control board related to controlling the mechanisms.

The printer storage unit 19 has nonvolatile memory and stores data. The data stored by the printer storage unit 19 is described further below.

The first communication unit 24 communicates with the slave printer 7 connected to the local area network LN as controlled by the device control unit 12S according to a specific communication protocol compatible with the network.

Note that when not specifically differentiating between the print control unit 17 and the configuration control unit 23 below, these function blocks may be collectively referred to as function units.

The master printer 12 also has a function for communicating with the control server 10 by the network GN (second network), and communicating with the slave printer 7 by the local area network LN (first network).

As shown in FIG. 3, the slave printer 7 has a device control unit 7S, a print unit 61 (first print unit), printer storage unit 62, and a communication interface 63.

The device control unit 7S includes a CPU, ROM, RAM, and other peripheral circuits, and controls the slave printer 7.

The print unit 61 includes a print mechanism that prints on print media, a conveyance mechanism that conveys the print media, and a cutter mechanism that cuts the print media, and a control board related to controlling the mechanisms.

The printer storage unit 62 has nonvolatile memory and stores data. The data stored by the printer storage unit 62 is described further below.

The communication interface 63 communicates with the master printer 12 connected to the local area network LN according to a specific communication protocol as controlled by the device control unit 7S.

The slave printer 7 has a function for communicating with the master printer 12 by the local area network LN (first network), and does not have a function for accessing the network GN (second network).

As shown in FIG. 3, the control server 10 has a server control unit 10S, a first connection unit 26, a control server storage unit 28, and a second connection unit 30.

The server control unit 10S includes a CPU, ROM, RAM, and other peripheral circuits, and controls the control server 10. The function blocks of the control server 10 include a communication management unit 25, the first connection unit 26, a print data processing unit 27, and a configuration processing unit 31. The functions of these function blocks are described further below.

The control server storage unit 28 has nonvolatile memory and stores data. The data stored by the control server storage unit 28 is described further below.

The second connection unit 30 communicates with the management device 14 by HTTP as controlled by the communication management unit 25. More specifically, a web browser is installed on the management device 14, and the second connection unit 30 communicates with the management device 14 by an HTTP connection in which the control server 10 is the server and the management device 14 is a client.

When not differentiating between the print data processing unit 27 and the configuration processing unit 31 below, these function blocks are referred to generically as process units.

As shown in FIG. 3, the management device 14 includes a management device control unit 40, a communication connection unit 41, and a display unit 42.

The management device control unit 40 includes CPU, ROM, RAM, and other peripheral circuits, and controls the management device 14. One function block of the management device control unit 40 is a browser execution unit 40a. The browser execution unit 40a is a function block whose function is rendered by a web browser.

The communication connection unit 41 communicates by HTTP as controlled by the management device control unit 40 with the control server 10.

The display unit 42 has an LCD or other type of display panel, and displays images on the display panel as controlled by the management device control unit 40.

Note that FIG. 3 shows the relationship between the control server 10 and one master printer 12 connected to the control server 10. When plural master printers 12 are connected to the control server 10, the control server 10 has the same number of WebSocket interfaces as there are master printers 12, establishes a WebSocket connection CT with each master printer 12, and communicates by WebSocket protocol through the connections to each master printer 12.

FIG. 3 also shows the relationship between the control server 10 and one management device 14 connected to the control server 10. When plural management devices 14 are connected to the control server 10, the control server 10 has plural second connection units 30 corresponding to the plural management devices 14, establishes a connection with each management device 14, and communicates with each management device 14.

The operation of the master printer 12 and control server 10 when the master printer 12 power turns on is described next.

Figure 4:
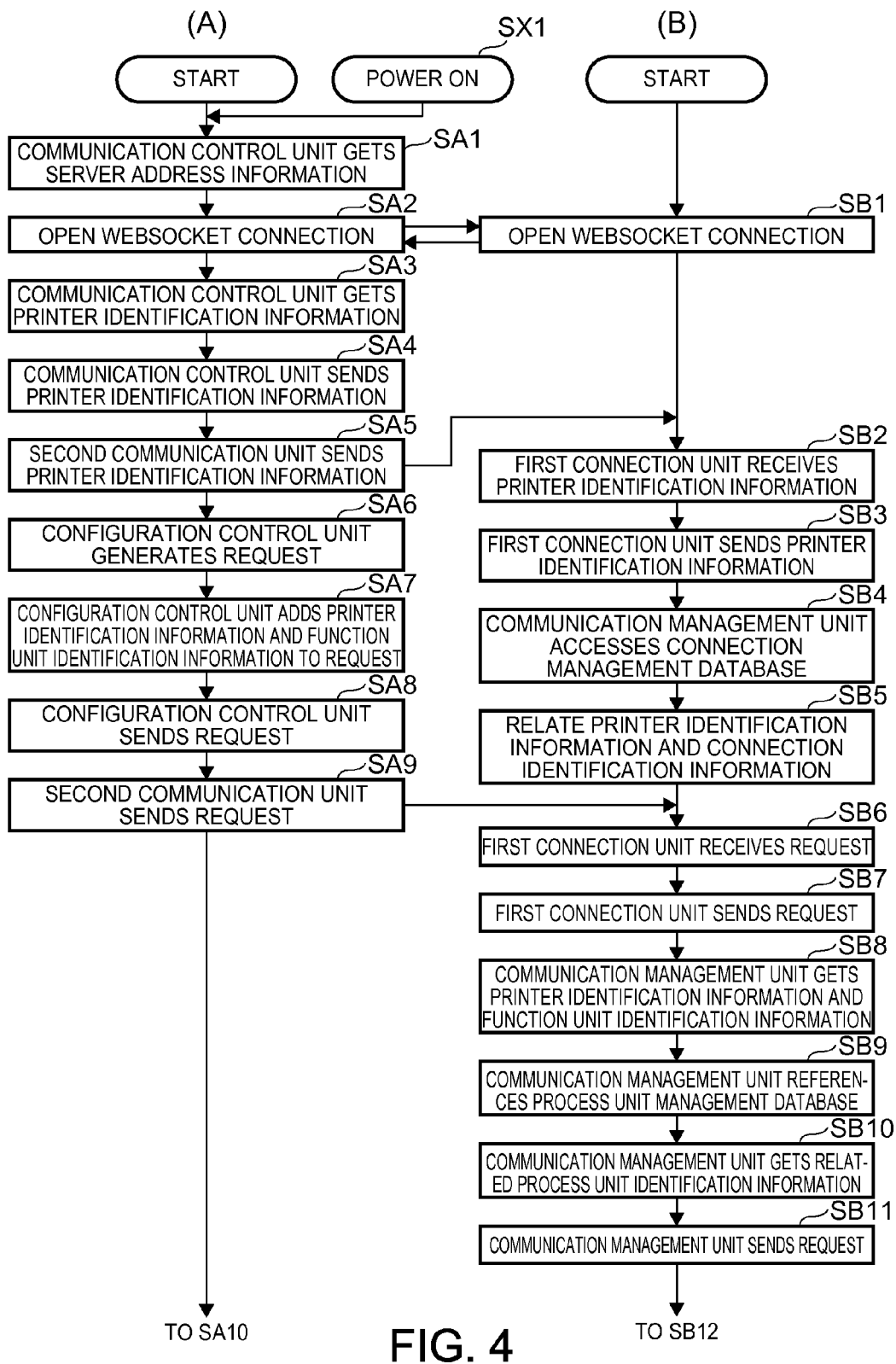
FIG. 4 is a flowchart showing the operation of a printing device and the control server.
Figure 5:
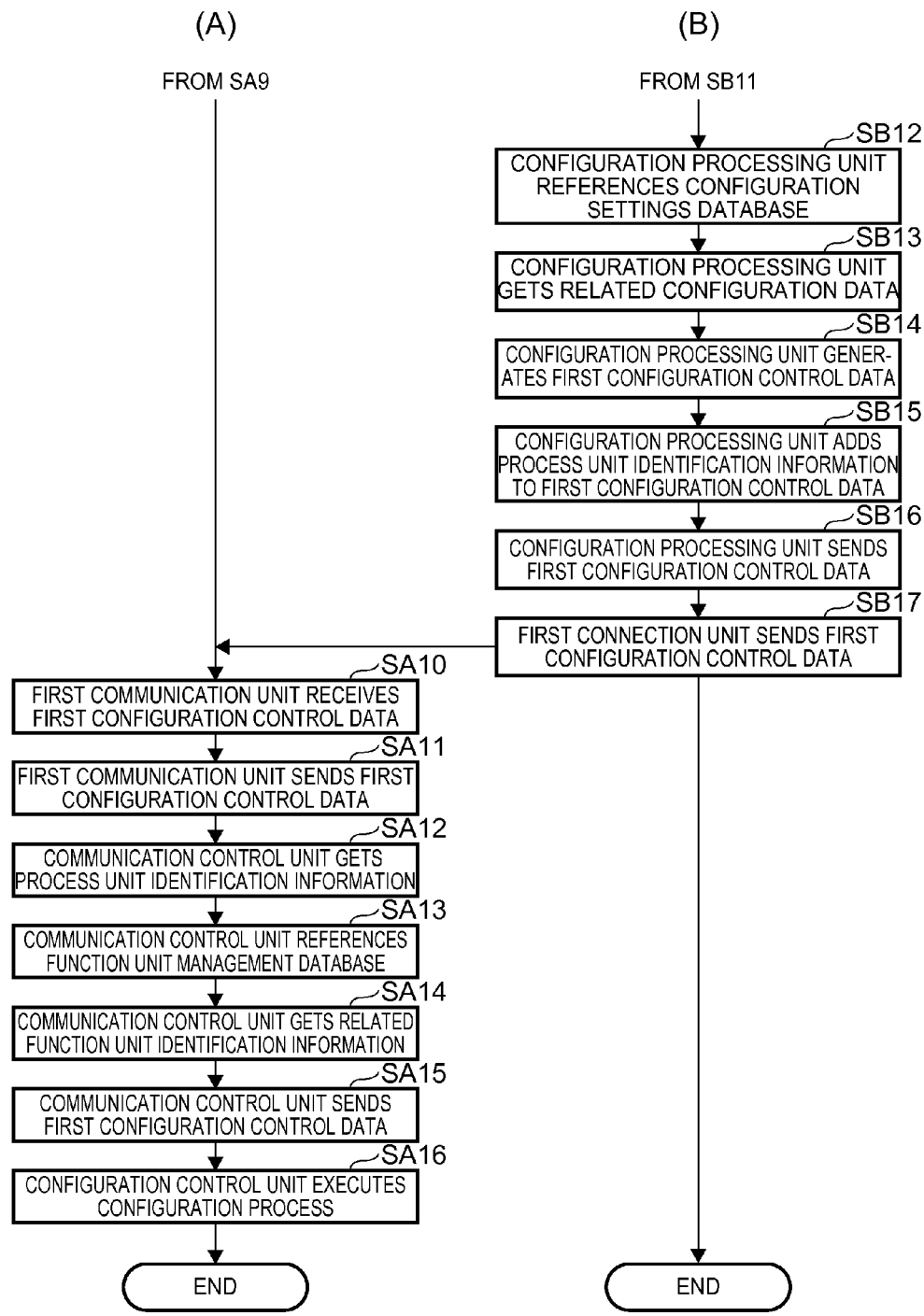
FIG. 5 is a flowchart showing the operation of a printing device and the control server.

FIG. 4 and FIG. 5 are a flow chart showing the operation of the master printer 12 and the control server 10 after the master printer 12 power turns on, column (A) showing the operation of the master printer 12, and (B) showing the operation of the control server 10.

The trigger of the process shown in the flow chart in FIG. 4 and FIG. 5 is not limited to the power turning on. For example, this process may be triggered by the master printer 12 communicatively connecting to the network GN, or by an instruction from a user.

Note that in the operation described below the master printer 12 is connected to the local area network LN of the store system 11 in which it is used, and can access the network GN.

The functions of the communication control unit 15, print control unit 17, and configuration control unit 23 of the master printer 12, and the communication management unit 25, print data processing unit 27, and configuration processing unit 31 of the control server 10 in the following description of the invention are embodied as described below, for example.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 4 (A), when the master printer 12 power turns on (step SX1), the communication control unit 15 of the master printer 12 accesses the printer storage unit 19 and gets the destination address data stored in the printer storage unit 19 (step SA1).

The address data is data identifying the address (such as the domain name, IP address, or path name) of the control server 10 accessed for establishing a WebSocket connection CT. To open a WebSocket connection CT for WebSocket communication, the client (the master printer 12 in this example) completes an HTTP (HyperText Transfer Protocol) handshake with the server (the control server 10 in this example). The client sends messages including a message containing the address of the server in the handshake, and the destination address data contains the address to access.

Next, the communication control unit 15 opens a WebSocket connection CT between the communication management unit 25 of the control server 10, the second communication unit 16, and the first connection unit 26 based on the address indicated by the address data (step SA2, step SB1). The master printer 12 according to this embodiment establishes a WebSocket connection CT when triggered by the power turning on, without waiting for a command from the user or a request from the control server 10.

The communication unit 16 and first connection unit 26 are WebSocket interfaces enabling data communication based on the WebSocket protocol and methods. These function blocks are instantiated using a WebSocket Socket library, for example.

More specifically, the second communication unit 16 has functions for processing data that is received from the communication control unit 15, print control unit 17, or configuration control unit 23 according to the WebSocket protocol, and sending the data through the WebSocket connection CT based on WebSocket methods. The second communication unit 16 also has functions for processing data that is received through the WebSocket connection CT according to WebSocket, and sending to the communication control unit 15. The first connection unit 26 is similarly configured.

By establishing a WebSocket connection CT, the master printer 12 and the control server 10 can communicate through an asynchronous, duplex communication link. More specifically, the control server 10 can push data to the master printer 12 through the WebSocket connection CT without receiving a request from the master printer 12 operating as a client. The master printer 12 can likewise push data through the WebSocket connection CT to the control server 10.

By establishing a WebSocket connection CT, a first function unit communication path KT1 based on the WebSocket connection CT is established between the print control unit 17 of the master printer 12, and the print data processing unit 27 of the control server 10.

The first function unit communication path KT1 is a logical communication path for data communication between the print control unit 17 and print data processing unit 27. The print control unit 17 and print data processing unit 27 can communicate by asynchronous duplex communication through the first function unit communication path KT1. Asynchronous duplex communication through the first function unit communication path KT1 is described further below.

By establishing a WebSocket connection CT, a second function unit communication path KT2 based on the WebSocket connection CT is established between the configuration control unit 23 of the master printer 12, and the configuration processing unit 31 of the control server 10. The second function unit communication path KT2 is a logical communication path for data communication between the configuration control unit 23 and the configuration processing unit 31. The configuration control unit 23 and the configuration processing unit 31 communicate by asynchronous duplex communication through the second function unit communication path KT2. Asynchronous duplex communication through the second function unit communication path KT2 is described further below.

Next, communication control unit 15 of the master printer 12 accesses the printer storage unit 19 and gets the printer identification information stored in the printer storage unit 19 (step SA3). The printer identification information is data identifying the master printer 12. The printer identification information may be, for example, the serial number assigned to the master printer 12 when the master printer 12 was manufactured.

Next, the communication control unit 15 sends the acquired printer identification information to the second communication unit 16 (step SA4).

The first communication unit 16 then sends the received printer identification information through the WebSocket connection CT to the control server 10 (step SA5).

As shown in FIG. 4 (B), the first connection unit 26 of the control server 10 receives the printer identification information through the WebSocket connection CT (step SB2).

Next, the first connection unit 26 sends the received printer identification information data to the communication management unit 25 (step SB3).

The communication management unit 25 accesses the connection management database stored in the control server storage unit 28 (step SB4). The connection management database is a database relationally storing for the WebSocket connections CT that were established connection identification information identifying the WebSocket connection CT and the printer identification information of the printer.

Next, the communication management unit 25 creates one record in the connection management database. The communication management unit 25 then relationally stores in the created record the connection identification information of the WebSocket connection CT established in step SB1 and the printer identification information indicated by the identification data received in step SB2 (step SB5).

Note that when a WebSocket connection CT is opened, the communication management unit 25 generates connection identification information for that connection that is different from the connection identification information of any other WebSocket connection CT that was already opened. The control server 10 manages the relationships between WebSocket connections CT and master printers 12 by the process of step SB4.

The master printer 12 thus establishes a WebSocket connection CT when triggered by the power turning on without receiving a user instruction or a request from the control server 10. Thus comprised, the user does not need to perform a complicated operation to open a WebSocket connection CT. Special knowledge is also not needed to open a WebSocket connection CT. After the power turns on, the master printer 12 can also be quickly enabled to execute processes controlled by the control server 10.

As shown in FIG. 4 (A), the configuration control unit 23 of the master printer 12 generates a request (step SA6). This request is a command requesting the control server 10 to send first configuration control data (described below). The request is data conforming to a specific format.

Next, the configuration control unit 23 adds the printer identification information and the function unit identification information of the configuration control unit 23 to the generated request (step SA7). The function unit identification information is identification information identifying a particular function unit of the master printer 12. A different value is assigned as the function unit identification information of the print control unit 17 and the configuration control unit 23 of the master printer 12. In step SA7, the configuration control unit 23 references the printer identification information stored in the printer storage unit 19, and based on this data adds the printer identification information to the request. The configuration control unit 23 also manages the function unit identification information assigned to the configuration control unit 23, and based thereon adds the function unit identification information to the request.

Next, the configuration control unit 23 sends the request to the second communication unit 16 (step SA8).

The second communication unit 16 sends the request to the control server 10 through the WebSocket connection CT (step SA9).

As shown in FIG. 4 (B), the first connection unit 26 of the control server 10 receives the request through the WebSocket connection CT (step SB6).

Next, the first connection unit 26 sends the received request to the communication management unit 25 (step SB7).

The communication management unit 25 then acquires the printer identification information and the function unit identification information added to the request (step SB8).

Next, the communication management unit 25 references the process unit management database stored by the control server storage unit 28 (step SB9). The process unit management database is a database that relationally stores a set of printer identification information and function unit identification information with process unit identification information.

Next, the communication management unit 25 acquires the process unit identification information related to this set of identification information from the process unit management database using the printer identification information and function unit identification information acquired in step SB8 as the search key (step SB10). The process unit identification information is identification information of a process unit of the control server 10. A different value is therefore assigned as the process unit identification information to the print data processing unit 27 and the configuration processing unit 31 of the control server 10. The process unit identification information acquired by the communication management unit 25 in step SB10 is the process unit identification information identifying the process unit that sends the received data by the WebSocket connection CT.

Next, the communication management unit 25 sends the request (step SB11) to the process unit identified by the process unit identification information acquired in step SB10 (configuration processing unit 31 in this example). Note that the communication management unit 25 manages the relationships between process unit and process unit identification information, and can send data to the process unit corresponding to the process unit identification information based on a single process unit identification information value.

As shown in FIG. 5 (B), when a request is received, the configuration processing unit 31 of the control server 10 references the configuration settings database stored by the control server storage unit 28 (step SB12).

The configuration settings database relationally stores printer identification information and configuration data for each master printer 12 connected to the control server 10.

The configuration data is information relating one or a plurality of settings related to the print unit 18 of the master printer 12 to the value of that setting.

Configurable settings of the master printer 12 in this embodiment of the invention include a print density setting, which is a setting related to the image density when printing; a print speed setting, which relates to the speed of printing; and a paper width setting, which is a setting related to the width of the print medium (roll paper in this example) that is set in the master printer 12. The settings are not limited to those described in this embodiment, and may further include network-related settings, audio-related settings when the device has an audio output function, and other settings.

Values available as the print density setting of the master printer 12 according to this embodiment include DARK indicating the print density is dark, and LIGHT indicating the print density is light. Values available as the print speed setting of the master printer 12 according to this embodiment include FAST indicating a high print speed, and SLOW indicating a low print speed. Values available as the paper width setting of the master printer 12 according to this embodiment include 80 mm indicating the width of the installed roll paper is 80 mm, and 58 mm indicating the width of the installed roll paper is 58 mm.

For example, the configuration data may be information relating the print density setting and DARK, the print speed setting and FAST, and the paper width setting and 80 mm.

Next, the configuration processing unit 31 acquires the configuration data related to the identification information from the configuration settings database using the printer identification information added to the request as the search key (step SB13).

Next, the configuration processing unit 31 generates first configuration control data based on the acquired configuration data (step SB14).

The first configuration control data specifies the values of specific settings, and is data instructing setting the values of the configuration items to the specified values in the configuration control unit 23 of the master printer 12. In this example, the first configuration control data is data instructing setting the print density setting to DARK, the print speed setting to FAST, and the paper width setting to 80 mm.

Next, the configuration processing unit 31 adds the process unit identification information to the first configuration control data (step SB15). The configuration processing unit 31 manages the process unit identification information assigned to the configuration processing unit 31.

Next, the configuration processing unit 31 sends the first configuration control data to the first connection unit 26 (step SB16).

The first connection unit 26 then sends the received first configuration control data through the WebSocket connection CT to the master printer 12 (step SB17).

As shown in FIG. 5 (A), the second communication unit 16 of the master printer 12 receives the first configuration control data through the WebSocket connection CT (step SA10). Next, the second communication unit 16 sends the first configuration control data to the communication control unit 15 (step SA11).

The communication control unit 15 then acquires the process unit identification information added to the first configuration control data (step SA12).

Next, the communication control unit 15 references the function unit management database (step SA13).

The function unit management database is a database that relationally stores the function unit identification information, which is the identification information of the function units of the master printer 12, and the process unit identification information of the corresponding process unit.

When there is a 1:1 correspondence between the function unit and process unit, the one function unit can process the data sent by the one process unit, and the one process unit can process data sent by the one function unit. The one process unit can therefore send data to the corresponding one function unit for processing by the one function unit using a function of the one function unit. The one function unit can also send data to the corresponding one process unit for processing by the one process unit using a function of the one process unit. In this example, the print control unit 17 of the master printer 12 is related to the print data processing unit 27 of the control server 10. The configuration control unit 23 of the master printer 12 is also related to the configuration processing unit 31 of the control server 10.

Next, the communication control unit 15 acquires the function unit identification information related to the process unit identification information from the function unit management database using the process unit identification information acquired in step SA12 as the search key (step SA14).

Next, the communication control unit 15 sends the first configuration control data to the function unit identified by the function unit identification information acquired in step SA14 (the configuration control unit 23 in this example) (step SA15). The communication control unit 15 manages the relationships between function unit identification information and function units. Therefore, based on the acquired function unit identification information, the communication control unit 15 can send data to the function unit identified by the one function unit identification information.

Based on the received first configuration control data, the configuration control unit 23 executes the configuration process (step SA16).

The configuration process is a process in which the configuration control unit 23 sets specific configuration settings to the values specified by the first configuration control data.

In this example, the printer storage unit 19 of the master printer 12 stores a configuration file containing information relating settings to their corresponding values. In the configuration process of step SA16, the configuration control unit 23 accesses the configuration file, and rewrites the content of the configuration file so that the settings are set to the corresponding values specified in the first configuration control data. The configuration process may be a process of changing the values of variables related to settings defined in a program.

As described above, a WebSocket connection CT is established between the master printer 12 and the control server 10 triggered by the master printer 12 power turning on in this embodiment of the invention. After the WebSocket connection CT is established, the master printer 12 requests transmission of the first configuration control data through the connection, and the control server 10 sends the first configuration control data in response to the request. The master printer 12 then runs a configuration process based on the received first configuration control data. As a result, the master printer 12 can set the values corresponding to specific settings without receiving a user instruction or request from the control server 10. The user therefore does not need to make settings manually, and the user requires no special knowledge to configure settings.

After the WebSocket connection CT is established, the configuration processing unit 31 of the control server 10 and the configuration control unit 23 of the master printer 12 can communicate by asynchronous duplex communication through the second function unit communication path KT2 based on the WebSocket connection CT.

As also described above, the communication management unit 25 of the control server 10 switches the destination of the received data to the print data processing unit 27 or the configuration processing unit 31. As a result, the data received by the control server 10 is sent to the corresponding process unit, and a corresponding process is executed by that process unit.

The communication control unit 15 of the master printer 12 likewise switches the destination of the received data to the print control unit 17 or the configuration control unit 23. As a result, the data received by the master printer 12 is sent to the corresponding function unit, and a corresponding process is executed by that function unit.

Operation of devices in the print control system 1 when the management device 14 controls a specific slave printer 7 to execute the configuration process is described next.

Figure 6:
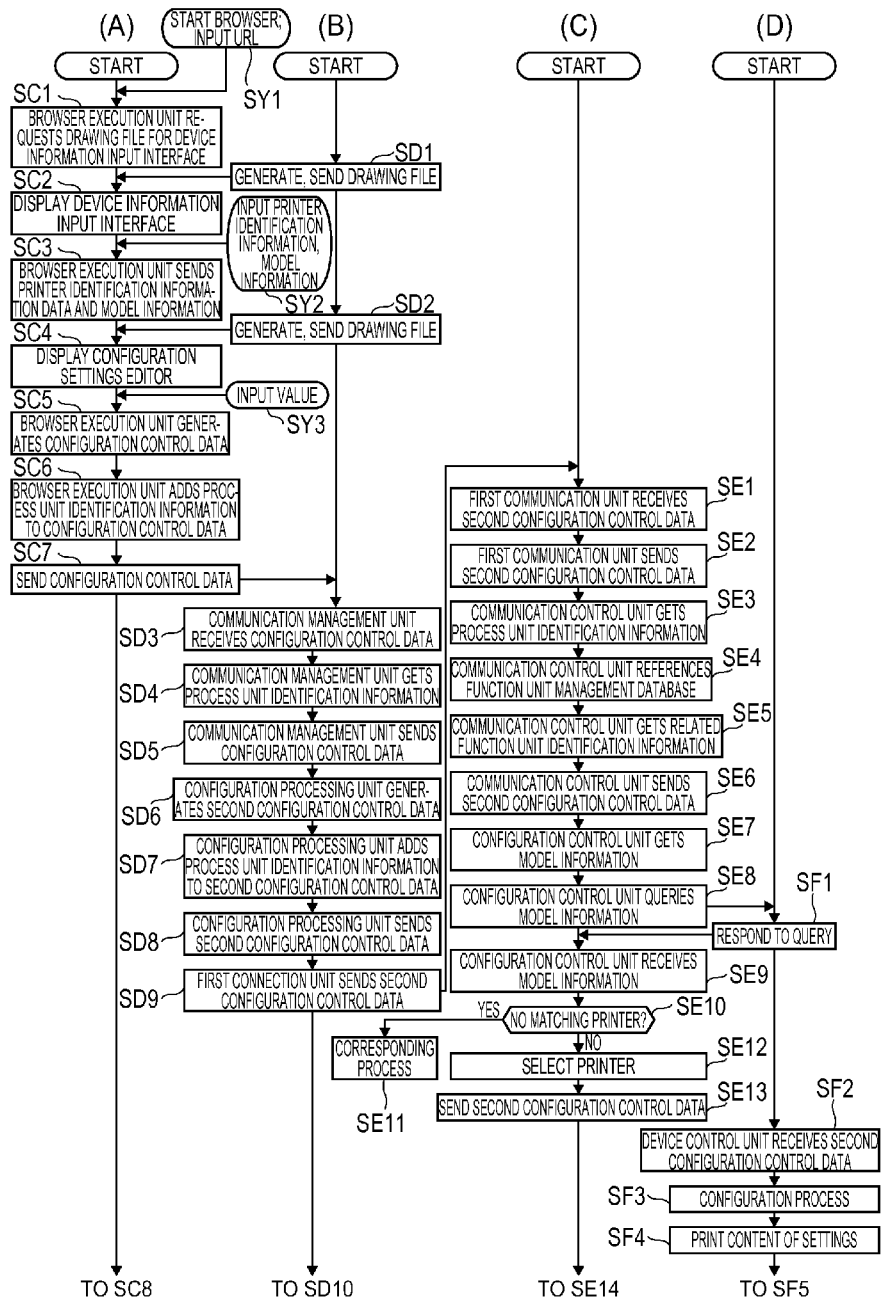
FIG. 6 is a flow chart showing the operation of devices in the print control system.
Figure 7:
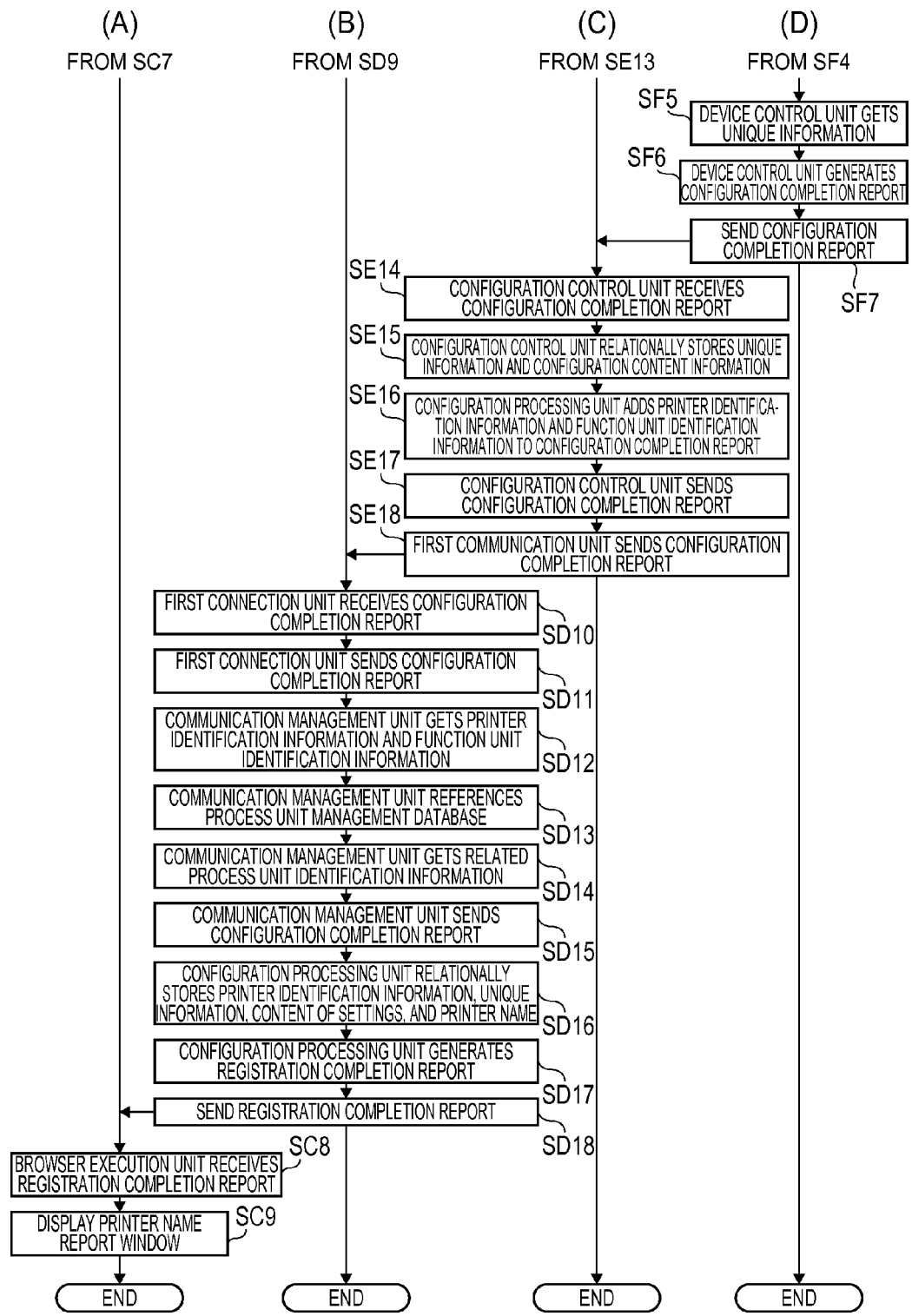
FIG. 7 is a flow chart showing the operation of devices in the print control system.

FIG. 6 and FIG. 7 are a flow chart showing the operation of devices in the print control system 1 when the management device 14 controls the slave printer 7 to execute the configuration process. In the figures, (A) shows the operation of the management device 14, (B) shows the operation of the control server 10, (C) shows the operation of the master printer 12, and (D) shows the operation of the slave printer 7.

As described further below, the user sets the model (attribute) of the slave printer 7 on the management device 14 to cause a slave printer 7 of the specified model to execute the configuration process. Because the specifications and functions of the slave printer 7 vary according to the model, determining the model of slave printer 7 is important when building the store system 11. The user therefore often knows the model of slave printer 7 used in the store system 11. As also described further below, the print control system 1 uses the MAC address of the slave printer 7 as unique information. When the user does not know the model of slave printer 7, the model of slave printer 7 can be easily determined by checking the unique information.

As described below, the print control system 1 according to this embodiment enables the user to desirably configure a slave printer 7 of a specified model by specifying the model for the management device 14.

The operation in each step of the configuration process when a slave printer 7 of the model specified by the user executes the configuration process is described with reference to the flow chart in FIG. FIG. 6 and FIG. 7.

Note that the function of the browser execution unit 40a of the management device control unit 40 of the management device 14 is embodied by the function of an application that runs on the browser or a function of a script in a drawing file (described below).

As shown in FIG. 6 (A), the user first starts the browser on the management device 14, and inputs a command to access a specific URL (step SY1). This URL is the URL accessed by the management device 14 to display a user interface 70 for inputting device information (referred to below as the device information input interface 70) in a browser window. This specific URL is a URL managed by the control server 10, and is made known in advance to the user.

As shown in FIG. 6 (A), in response to the user instruction in step SY1, the browser execution unit 40a of the management device control unit 40 of the management device 14 accesses the specified URL, and requests the drawing file for displaying the device information input interface 70 (step SC1). This drawing file is a file written in markup language such as HTML (HyperText Markup Language), and is a file for displaying a web page in a browser window on the management device 14.

As shown in FIG. 6 (B), in response to the request of the management device 14 in step SC1, the control server 10 generates and sends a drawing file for the device information input interface 70 to the management device 14 (step SD1).

As shown in FIG. 6 (A), the browser execution unit 40*a* of the management device control unit 40 of the management device 14 then displays the device information input interface 70 based on the drawing file acquired in response to the request of step SC1 (step SC2).

Figure 8:
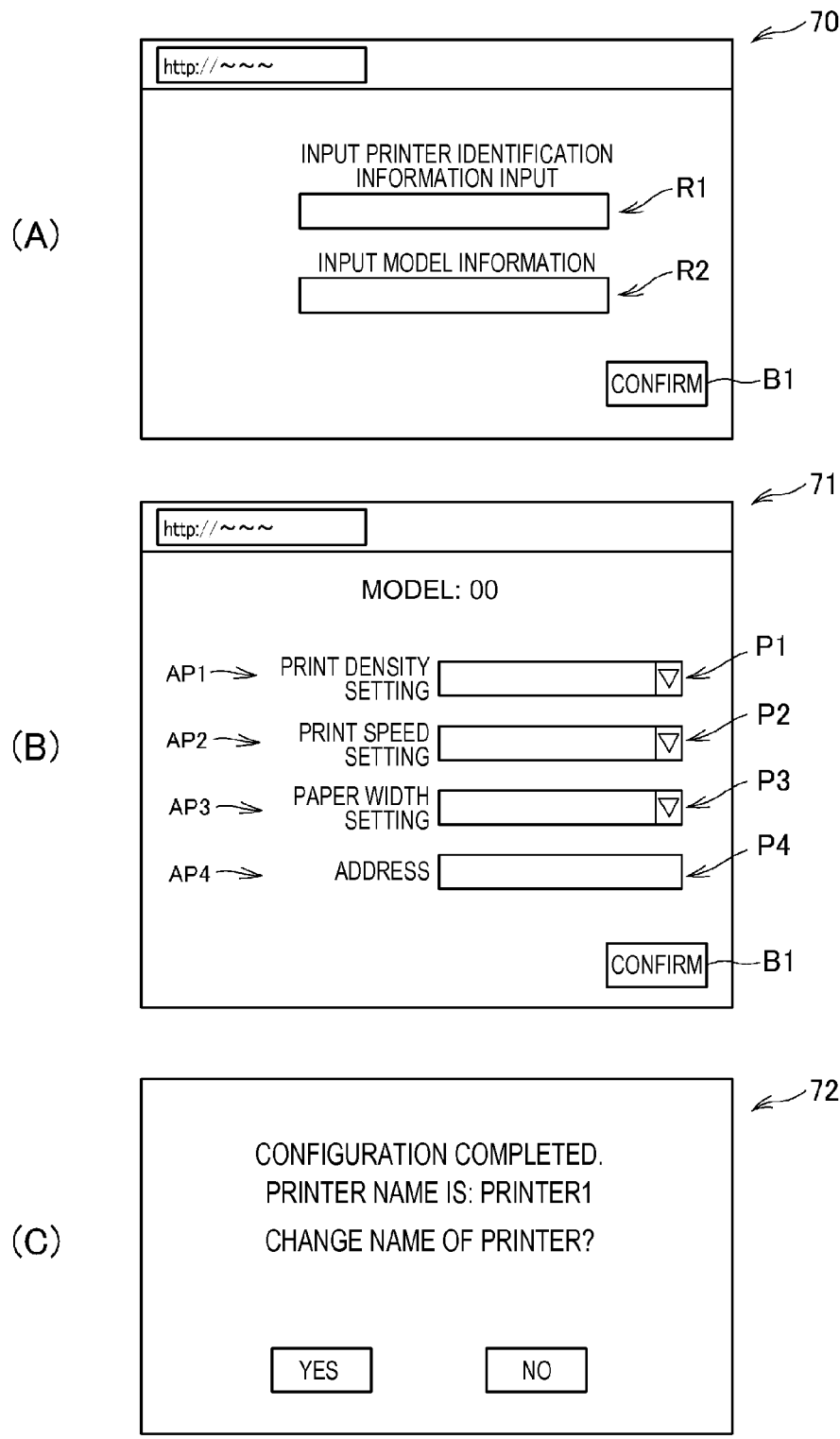
FIG. 8 shows an example of a user interface provided by a management device.

FIG. 8 (A) shows an example of a device information input interface 70.

As shown in FIG. 8 (A), the device information input interface 70 has an input field R1 to which the user inputs the printer identification information, an input field R2 for inputting model information (attribute information) identifying the model of slave printer 7 to runs the configuration process, and a button B1 for confirming the input to the input fields.

The user inputs the printer identification information of the corresponding slave printer 7 and the master printer 12 connected to the local area network LN (step SY2). In this example the user knows the printer identification information of the corresponding master printer 12. Note that the control server 10 may manage the relationships between the store system 11 and the printer identification information of the master printers 12 in the store system 11, and respond to queries for printer identification information from the management device 14.

The user inputs the model information of the slave printer 7 to the input field R2, and then clicks the button B1 (step SY2).

The browser execution unit 40*a* of the management device control unit 40 of the management device 14 then sends the printer identification information and model information data input to the device information input interface 70 to the control server 10 according to a specific protocol (step SC3). The process of step SC3 is executed by a function of a script embedded in the drawing file related to the device information input interface 70, for example.

As shown in FIG. 6 (B), when the printer identification information and model information data is received, the control server 10 executes the following process.

The control server 10 generates and outputs to the management device 14 a drawing file related to the user interface 71 for inputting settings for the corresponding model (below, the configuration settings editor 71) of the slave printer 7 identified by the model information (step SD2).

In this example, the control server storage unit 28 of the control server 10 stores the information (referred to below as drawing data) required to generate the drawing file of the configuration settings editor 71 relationally to the model of the slave printer 7. In step SD2, the control server 10 acquires the drawing data corresponding to the model identified by the received data, and generates the drawing file based on the acquired drawing data.

As shown in FIG. 6 (A), the browser execution unit 40*a* of the management device control unit 40 of the management device 14 displays the configuration settings editor 71 based on the drawing file acquired in response to the request of step SC3 (step SC4).

Note that configurable settings of the slave printer 7 in this embodiment of the invention include a print density setting, a print speed setting, a paper width setting, and an address setting, which is a setting related to the address on the local area network LN (the IP address in this example).

FIG. 8 (B) shows an example of the configuration settings editor 71.

As shown in FIG. 8 (B), the configuration settings editor 71 is a user interface for inputting the desired values for the user configurable settings of a slave printer 7 of the corresponding model.

As shown in FIG. 8 (B), the configuration settings editor 71 has a print density setting area AP1 for setting the value of the print density setting. The print density setting area AP1 has a print density setting input field P1. The print density setting input field P1 is a field for inputting the value of the print density setting. The print density setting input field P1 is a pull-down menu. The user can input the value of the print density setting to the print density setting input field P1 by selecting either DARK or LIGHT from the pull-down menu.

The configuration settings editor 71 also has a print speed setting area AP2 for setting the value of the print speed setting. The print speed setting area AP2 has a print speed setting input field P2. The print speed setting input field P2 is a field for inputting the value of the print speed setting. The print speed setting input field P2 is a pull-down menu. The user can input the value of the print speed setting to the print speed setting input field P2 by selecting either FAST or SLOW from the pull-down menu.

The configuration settings editor 71 also has a paper width setting area AP3 for setting the value of the paper width setting. The paper width setting area AP3 has a paper width setting input field P3. The paper width setting input field P3 is a field for inputting the value of the paper width setting. The paper width setting input field P3 is a pull-down menu. The user can input the value of the paper width setting to the paper width setting input field P3 by selecting either 80 mm or 58 mm from the pull-down menu.

The configuration settings editor 71 also has an address setting area AP4 for specifying the address (the IP address in this example) of the slave printer 7 on the local area network LN. The address setting area AP4 has an address input field P4. The address input field P4 is a field for the user to input the IP address assigned to the slave printer 7. In this example, the IP address assigned to the slave printer 7 is equivalent to the value of the address setting as a user-configurable setting.

The configuration settings editor 71 also has a button B2 for confirming input to the respective fields.

The user inputs the desired values to the print density setting input field P1, print speed setting input field P2, paper width setting input field P3, and address input field P4 of the configuration settings editor 71, and then clicks the button B2 (step SY3).

Based on user input to the configuration settings editor 71, the browser execution unit 40*a* generates configuration command data (step SC5). The configuration command data is a command including the printer identification information and model information, and instructs the corresponding slave printer 7 to change the values of specific settings in the configuration data to the values the user input to the fields in the configuration settings editor 71.

Next, the browser execution unit 40*a* adds the process unit identification information of the process unit (the configuration processing unit 31 in this example) that executes the process based on the configuration command data to the generated configuration command data (step SC6). The browser execution unit 40a manages the process unit identification information of the process unit that processes the configuration command data, and based thereon adds the process unit identification information to the configuration command data. A configuration in which the user inputs the process unit identification information is also conceivable.

Next, the browser execution unit 40a controls the communication connection unit 41, and sends the configuration command data to the control server 10 (step SC7).

When the management device 14 and control server 10 communicate by HTTP, the browser execution unit 40a makes an HTTP handshake with the control server 10 and establishes a connection in step SC7. Next, the browser execution unit 40a controls the communication connection unit 41 to output the configuration command data through the opened connection.

As shown in FIG. 6 (B), the communication management unit 25 controls the second connection unit 30 to receive the configuration command data (step SD3).

Next, the communication management unit 25 acquires the process unit identification information contained in the configuration command data (step SD4).

Next, the communication management unit 25 sends the configuration command data to the process unit (configuration processing unit 31 in this example) identified by the process unit identification information acquired in step SD4 (step SD5).

Next, the configuration processing unit 31 generates second configuration control data based on the configuration command data (step SD6).

The second configuration control data is data specifying the value of a setting, and commanding the device control unit 7S of the slave printer 7 to set the value of a particular setting to the specified value. The specified value is the value the user input to the configuration settings editor 71. The second configuration control data is, for example, data setting the value of the print density setting to DARK, setting the value of the print speed setting to FAST, setting the value of the paper width setting to 80 mm, and setting the value of the address setting to 192.168.0.1. The printer identification information and model information are also contained in the second configuration control data.

Next, the configuration processing unit 31 sends adds the process unit identification information of the configuration processing unit 31 to the second configuration control data (step SD7).

Next, the configuration processing unit 31 sends the second configuration control data to the first connection unit 26 (step SD8).

The first connection unit 26 sends the received second configuration control data by WebSocket connection CT to the master printer 12 (step SD9).

As shown in FIG. 6 (C), the second communication unit 16 of the master printer 12 receives the second configuration control data by WebSocket connection CT (step SE1). Next, the second communication unit 16 sends the second configuration control data to the communication control unit 15 (step SE2).

The communication control unit 15 then acquires the process unit identification information added to the second configuration control data (step SE3).

Next, the communication control unit 15 references the function unit management database (step SE4).

Next, the communication control unit 15 gets the function unit identification information related to the process unit identification information from the function unit management database using the process unit identification information as the search key (step SE5).

Next, the communication control unit 15 sends the second configuration control data to the function unit (the configuration control unit 23 in this example) identified by the function unit identification information acquired in step SE5 (step SE6).

The communication control unit 15 manages the relationships between function unit identification information and function units. The communication control unit 15 can therefore send data to a particular single function unit based on the function unit identification information.

Next, the configuration control unit 23 gets the model information in the received second configuration control data (step SE7).

Next, the configuration control unit 23 controls the first communication unit 24 and requests transmission of the model information data to the slave printer 7 connected to the local area network LN (step SE8). Note that the master printer 12 can communicate with any desired slave printer 7 connected to the local area network LN using the TCP/IP protocol, for example. Of the plural slave printers 7 connected to the local area network LN in this example, the configuration control unit 23 requests sending the model information in step SE8 to a slave printer 7 that has not run the configuration process and which has not been configured with the values of the settings. The slave printers 7 that have completed the configuration process are managed in a device information management database described below.

The configuration control unit 23 references the device information management database stored by the printer storage unit 19 to determine which of the slave printers 7 connected to the local area network LN have not completed the configuration process, and requests transmission of the model information to those identified slave printers 7. Alternatively, the configuration control unit 23 may request broadcasting the model information data to all slave printers 7 connected to the local area network LN, and read and discard replies from the slave printers 7 that have already completed the configuration process.

The slave printer 7 in this example has not executed the configuration process, and has not set the corresponding settings to the values (such as the IP address setting) in the received data.

As shown in FIG. 6 (D), the device control unit 7S of the slave printer 7 according to this embodiment sends (responds) data indicating the model information of the slave printer 7 to the master printer 12 in response to the request in step SE8 (step SF1). The printer storage unit 62 of the slave printer 7 stores the model information data, and the device control unit 7S sends the model information data of the slave printer 7 based on the stored data.

As shown in FIG. 6 (C), the configuration control unit 23 of the master printer 12 controls the first communication unit 24 and receives the model information data from the slave printer 7 (step SE9). If there are plural slave printers 7 connected to the local area network LN that have not executed the configuration process, the configuration control unit 23 receives the model information data from the plural slave printers 7 in step SE9.

Next, the configuration control unit 23 determines if there is even one match between the model information indicated by the data received in step SE9 and the model information acquired in step SE7 (step SE10).

If there is not even a single match (step SE10 returns YES), the configuration control unit 23 executes an appropriate process (step SE11). In step SE11, the configuration control unit 23 may send specific data to the control server 10 reporting that there is no slave printer 7 corresponding to the model specified by the user that has not executed the configuration process, for example. Alternatively, if the master printer 12 has a display unit or speaker, this report may be issued by a visual or audible display.

If there is match between the model information indicated by the data received in step SE9 and the model information acquired in step SE7 (step SE10 returns NO), the configuration control unit 23 executes the following process.

The configuration control unit 23 selects the slave printer 7 matching the model information as the slave printer 7 to which to send the second configuration control data and run the configuration process (step SE12). If there are plural slave printers 7 with matching model information in step SE12, the configuration control unit 23 selects any one of the slave printers 7 as the slave printer 7 to which to send the second configuration control data and run the configuration process. Therefore, when there are plural slave printers 7 that match the model information, any one of the slave printers 7 executes the configuration process instead of a specific slave printer 7 in the group of plural slave printers 7 executing the configuration process. As described below, a slave printer 7 that has run the configuration process executes a process of printing the content of the settings made in the configuration process to a print medium. Therefore, even when there are plural slave printers 7 that match the model information, the user can know which slave printers 7 have completed which settings after running the configuration process.

In this example, the configuration control unit 23 selects the slave printer 7 according to this embodiment in step SE12.

Next, the configuration control unit 23 controls the first communication unit 24 to send the second configuration control data to the slave printer 7 selected in, step SE12 (step SE13).

As shown in FIG. 6 (D), the device control unit 7S of the slave printer 7 controls the communication interface 63 to receive the second configuration control data (step SF2).

Next, the device control unit 7S executes the configuration process based on the second configuration control data (step SF3). The configuration process is a process of setting the values of configurable settings to the values specified in the second configuration control data. For example, in the configuration process executed in step SF3, the device control unit 7S sets (changes) the IP address of the slave printer 7 to the IP address specified in the second configuration control data.

When the configuration process ends, the device control unit 7S controls the print unit 61 to print information indicating the content of the settings made by the configuration process in step SF3 (step SF4).

The slave printer 7 thus prints information indicating the content of the settings made in the configuration process after the configuration process ends. As a result, the user can know which slave printers 7 made what settings when the configuration process is executed by a slave printer 7. This enables the user to know this information even when the slave printer 7 does not have a display unit or speaker.

As shown in FIG. 7 (D), the device control unit 7S of the slave printer 7 acquires specific information representing the unique information of the slave printer 7 (step SF5). This unique information is information uniquely identifying the slave printer 7, and in this embodiment of the invention is the MAC address. This unique information may be stored by the printer storage unit 62 of the slave printer 7. Further alternatively, the device control unit 7S may communicate with the CPU of the communication board to get the MAC address in step SF6, and acquire the unique information based on the acquired MAC address.

Next, the device control unit 7S creates a configuration completion report (step SF6). The configuration completion report is data containing the unique information acquired in step SF5, information indicating that configuration based on the second configuration control data completed, and information (referred to below as as "configuration content information") indicating the content of the settings made by the configuration process in step SF3. The content of the settings made in the configuration process includes the setting (such as the print density) and the value of the setting (such as DARK).

Next, the device control unit 7S controls the communication interface 63 to send to send the configuration completion report generated in step SF6 to the master printer 12 (step SF7).

As shown in FIG. 7 (C), the configuration control unit 23 controls the first communication unit 24 to receive the configuration completion report (step SE14).

Next, the configuration control unit 23 accesses the device information management database stored by the printer storage unit 19 based on the received configuration completion report, and creates one record in the database (step SE15). This record is a record relationally storing the unique information and the configuration content information.

The device information management database relationally stores the unique information (the MAC address in this example) and the configuration content information (including the set IP address in this example) for each slave printer 7 that is connected to the local area network LN and has made the settings in the configuration process. As a result, by referencing the device information management database, the configuration control unit 23 can get the unique information and IP address of any slave printer 7 that has completed the configuration process.

Next, the configuration control unit 23 adds the printer identification information and the function unit identification information of the configuration control unit 23 to the received configuration completion report (step SE16).

Next, the configuration control unit 23 sends the configuration completion report to the second communication unit 16 (step SE17).

The second communication unit 16 sends the configuration completion report by the WebSocket connection CT to the control server (step SE18).

As shown in FIG. 7 (D), the first connection unit 26 of the control server 10 receives the configuration completion report by the WebSocket connection CT (step SD10).

Next, the first connection unit 26 sends the received configuration completion report to the communication management unit 25 (step SD11).

The communication management unit 25 acquires the printer identification information and function unit identification information added to the configuration completion report (step SD12). Next, the communication management unit 25 references the process unit management database stored by the control server storage unit (step SD13).

Next, using the set of printer identification information and function unit identification information acquired in step SD12 as the search key, the communication management unit 25 acquires the process unit identification information related to this set of identification information from the process unit management database (step SD14).

Next, the communication management unit 25 sends the configuration completion report to the process unit (the configuration processing unit 31 in this example) identified by the process unit identification information acquired in step SD14 (step SD15).

The configuration processing unit 31 accesses a unique information management database stored by the control server storage unit 28, and creates one record as described below (step SD16). This record relationally stores the printer identification information, the unique information contained in the configuration completion report, the configuration content information contained in the configuration completion report, and the printer name. The printer name as used here is a name assigned for identification to the slave printer 7, and in this example is simply "printer1." A different printer name is assigned to each slave printer 7 connected to the same local area network LN. As described further below, the user can change the printer name. In step SD16, the configuration processing unit 31 generates a different name for each slave printer 7 on the local area network LN according to specific rules, and stores the name in the corresponding field of the created record.

The control server 10 thus relationally stores the unique information of the slave printer 7 to the printer settings information for that printer in the control server storage unit 28. As a result, the control server 10 can store configuration information related to the unique information of a particular slave printer 7.

Next, the configuration processing unit 31 generates a registration completion report (step SD17). The registration completion report includes information that the slave printer 7 completed the configuration process and a record was successfully created in the unique information management database, and the printer name that was assigned.

Next, the configuration processing unit 31 controls the second connection unit 30 and sends the registration completion report to the management device 14 (step SD18).

As shown in FIG. 7 (A), the browser execution unit 40a of the management device control unit 40 controls the communication connection unit 41 to receive the registration completion report (step SC8).

Next, the browser execution unit 40a displays a printer name report window 72 based on the received registration completion report (step SC9). The printer name report window 72 is a pop-up window displayed by a function of a script contained in the drawing data in this example.

FIG. 8 (C) shows an example of the printer name report window 72.

As shown in FIG. 8 (C), the printer name report window 72 displays content that configuration of the slave printer 7 was completed. The assigned printer name is also displayed in the printer name report window 72. The user is also asked in the printer name report window 72 whether or not to change the printer name.

If the user selects to change the printer name, the browser execution unit 40a displays a window for inputting a new printer name by a function of a script, for example. When the user inputs the new printer name and confirms the change, the browser execution unit 40a generates and sends to the control server 10 a command to change the printer name stored in the corresponding record in the unique information management database. The configuration processing unit 31 of the control server 10 then changes the printer name in the corresponding record of the unique information management database based on the received command.

Operation of the control server 10 and the management device 14 when changing the content of the configuration data of a specific master printer 12 is described next.

As described above, the control server storage unit 28 of the control server 10 stores the configuration settings database. The configuration settings database stores printer identification information and configuration data for master printers 12 that connect to the control server 10.

In the print control system 1 according to this embodiment, the management device 14 can change the content of the configuration data of a specific master printer 12.

Figure 9:
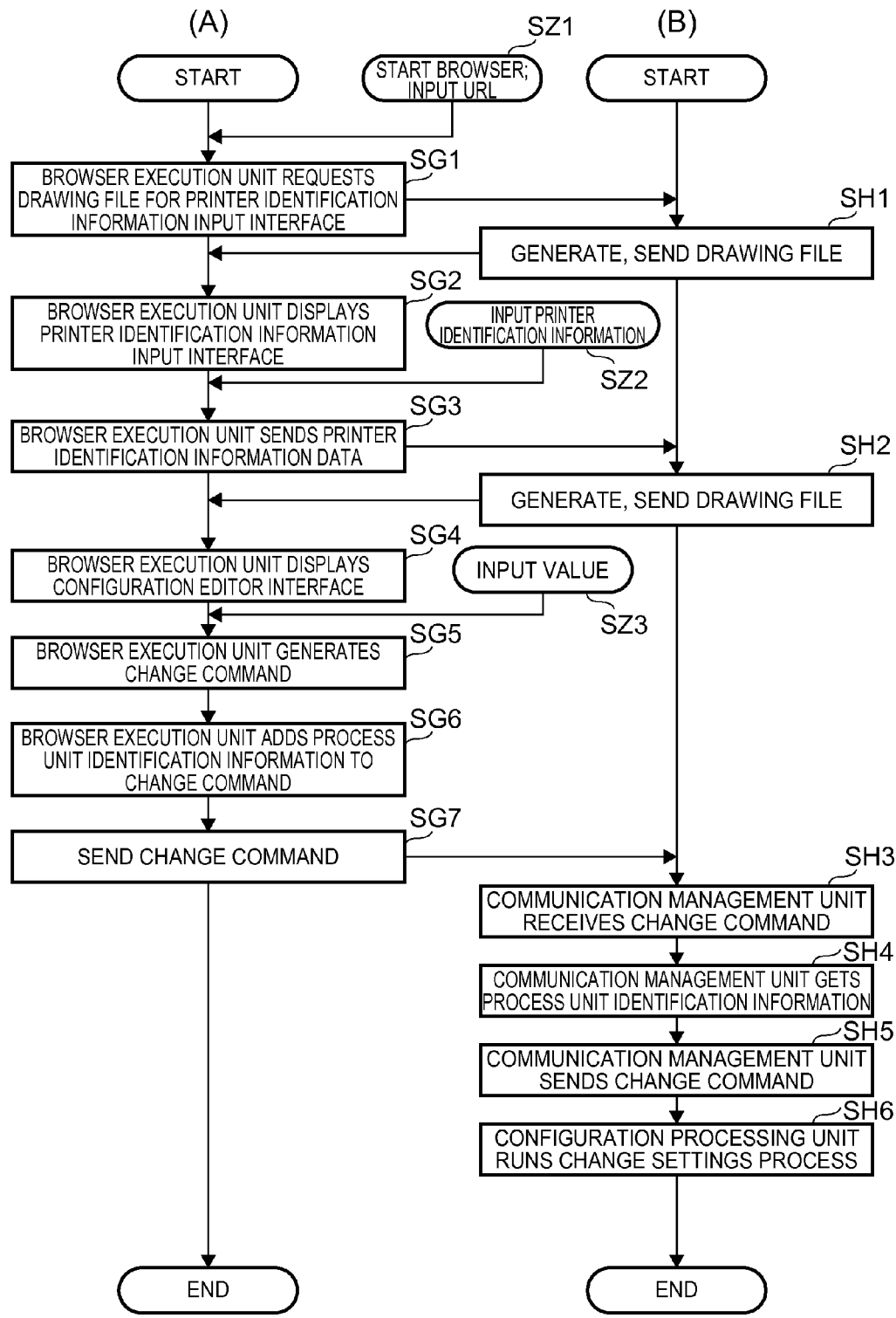
FIG. 9 is a flow chart showing the operation of the management device and the control server.

FIG. 9 is a flowchart showing the operation of the control server 10 and the management device 14 when changing the content of the configuration data of a specific master printer 12. FIG. 9 (A) shows the operation of the management device 14, and (B) shows the operation of the control server 10.

Note that the function of the browser execution unit 40a of the management device control unit 40 of the management device 14 described below is achieved by the function of an application that runs on the browser or the function of a script in a drawing file (described below).

The user first starts the browser on the management device 14, and inputs the URL to access (step SZ1). This URL is the URL accessed by the management device 14 to display a user interface 50 for inputting printer identification information (referred to below as the printer identification information input interface 50) in a browser window. This specific URL is a URL managed by the control server 10, and is given in advance by the administrator that manages the control server 10 to the user.

As shown in FIG. 9 (A), in response to the user instruction in step SZ1, the browser execution unit 40a of the management device control unit 40 of the management device 14 accesses the specified URL, and requests the drawing file for displaying the printer identification information input interface 50 (step SG1). This drawing file is a file written in markup language such as HTML (HyperText Markup Language), and is a file for displaying a web page in a browser window on the management device 14.

As shown in FIG. 9 (B), in response to the request of the management device 14 in step SG1, the control server 10 generates and sends a drawing file for the printer identification information input interface 50 to the management device 14 (step SH1).

As shown in FIG. 9 (A), the browser execution unit 40a of the management device control unit 40 of the management device 14 then displays the printer identification information input interface 50 based on the drawing file acquired in response to the request of step SG1 (step SG2).

Figure 10:
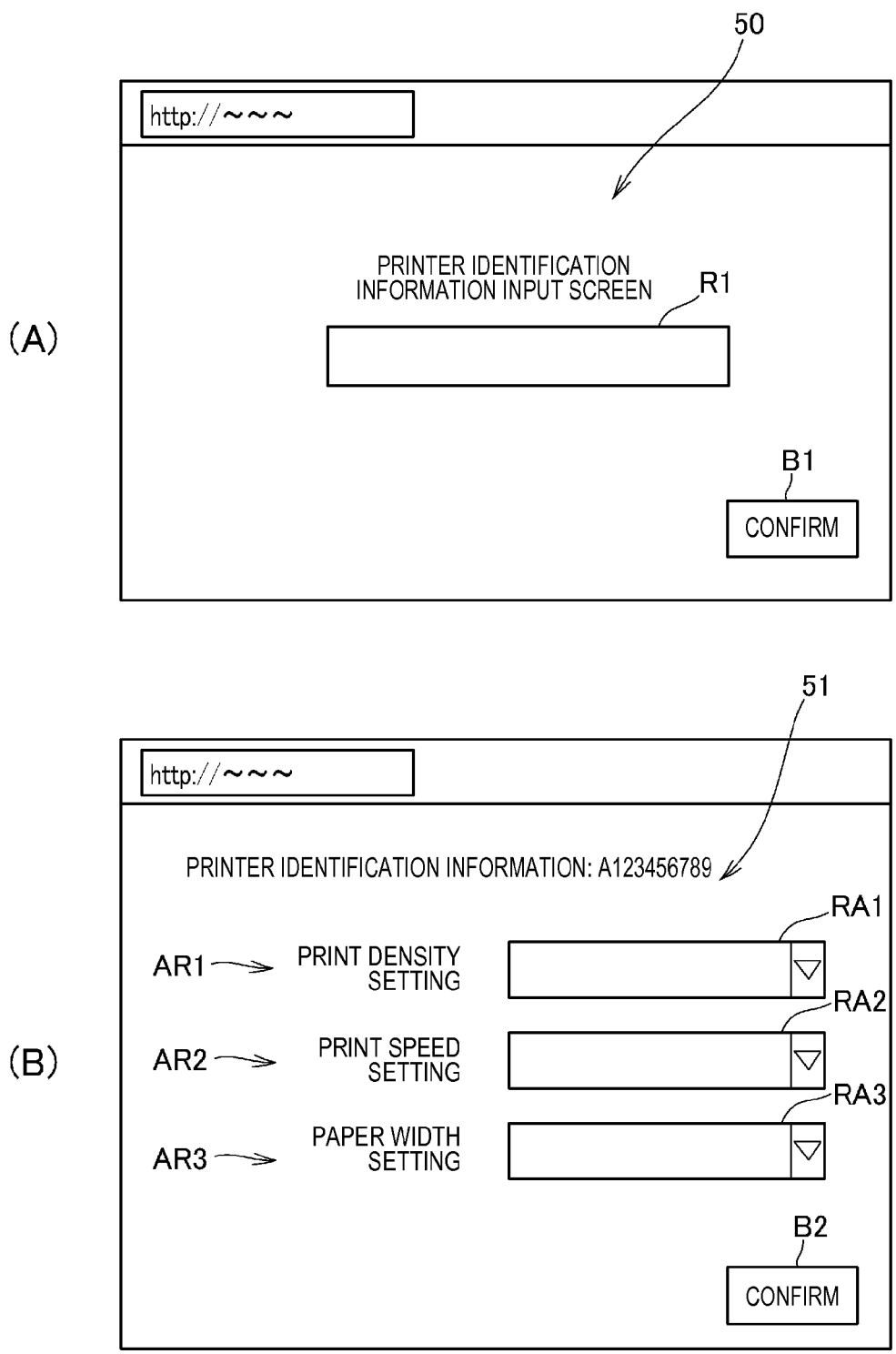
FIG. 10 shows an example of a user interface provided by a management device.

FIG. 10 (A) shows an example of a printer identification information input interface 50.

As shown in FIG. 10 (A), the printer identification information input interface 50 has an input field R1 to which the user inputs the printer identification information, and a button B1 for confirming the input to the input field R1.

The user inputs the printer identification information of the master printer 12 for which to change the content of the configuration data to the input field R1, and then clicks the button B1 (step SZ2).

The browser execution unit 40a of the management device control unit 40 of the management device 14 then sends the printer identification information data input to the printer identification information input interface 50 to the control server 10 according to a specific protocol (step SG3). The process of step SG3 is executed by a function of a script embedded in the drawing file related to the printer identification information input interface 50, for example.

As shown in FIG. 9 (B), when the printer identification information data is received, the control server 10 executes the following process.

The control server 10 generates and outputs to the management device 14 a drawing file related to the user interface for changing settings (below, the configuration editor interface 51) of the master printer 12 identified by the printer identification information (step SH2). In this example, the control server storage unit 28 of the control server 10 stores the information (referred to below as drawing data) required to generate the drawing file of the configuration editor interface 51 relationally to the printer identification information for each master printer 12 that connects to the control server 10. In step SH2, the control server 10 acquires the drawing data corresponding to the printer identification information identified by the received data, and generates the drawing file based on the acquired drawing data.

As shown in FIG. 9 (A), the browser execution unit 40a of the management device control unit 40 of the management device 14 displays the configuration editor interface 51 based on the drawing file acquired in response to the request of step SG3 (step SG4).

FIG. 10 (B) shows an example of the configuration editor interface 51.

As shown in FIG. 10 (B), the configuration editor interface 51 has fields for inputting the desired values of specific settings.

As shown in FIG. 10 (B), the printer identification information of the master printer 12 for which the configuration data is to be changed is displayed in the configuration editor interface 51.

The configuration editor interface 51 has a print density setting area AR1 for setting the value of the print density setting. The print density setting area AR1 has a print density setting input field RA1. The print density setting input field RA1 is a field for inputting the value of the print density setting. The print density setting input field RA1 is a pull-down menu. The user can input the value of the print density setting to the print density setting input field RA1 by selecting either DARK or LIGHT from the pull-down menu.

The configuration editor interface 51 also has a print speed setting area AR2 for setting the value of the print speed setting. The print speed setting area AR2 has a print speed setting input field RA2. The print speed setting input field RA2 is a field for inputting the value of the print speed setting. The print speed setting input field RA2 is a pull-down menu. The user can input the value of the print speed setting to the print speed setting input field RA2 by selecting either FAST or SLOW from the pull-down menu.

The configuration editor interface 51 also has a paper width setting area AR3 for setting the value of the paper width setting. The paper width setting area AR3 has a paper width setting input field RA3. The paper width setting input field RA3 is a field for inputting the value of the paper width setting. The paper width setting input field RA3 is a pull-down menu. The user can input the value of the paper width setting to the paper width setting input field RA3 by selecting either 80 mm or 58 mm from the pull-down menu.

The configuration editor interface 51 also has a button B2 for confirming the input to the print density setting input field RA1, print speed setting input field RA2, and paper width setting input field RA3.

The user inputs the desired values to the print density setting input field RA1, print speed setting input field RA2, and paper width setting input field RA3 of the configuration editor interface 51, and then clicks the button B2 (step SZ3).

Based on user input to the configuration editor interface 51, the browser execution unit 40a generates a change command (step SG5).

The change command is a command including printer identification information, and instructing changing the values of specific settings in the configuration data related to the printer identification information to the values the user input to the fields in the configuration editor interface 51.

Next, the browser execution unit 40a adds the process unit identification information of the process unit (the configuration processing unit 31 in this example) that executes the process based on the change command to the generated change command (step SG6). The browser execution unit 40a manages the process unit identification information of the process unit that processes the change command, and based thereon adds the process unit identification information to the change command. A configuration in which the user inputs the process unit identification information is also conceivable.

Next, the browser execution unit 40a controls the communication connection unit 41, and sends the change command to the control server (step SG7).

When the management device 14 and control server 10 communicate by HTTP, the browser execution unit 40a makes an HTTP handshake with the control server 10 and establishes a connection in step SG7. Next, the browser execution unit 40a controls the communication connection unit 41 to output the change command through the opened connection.

As shown in FIG. 9 (B), the communication management unit 25 controls the second connection unit 30 to receive the change command (step SH3).

Next, the communication management unit 25 acquires the process unit identification information contained in the change command (step SH4).

Next, the communication management unit 25 sends the change command to the process unit (configuration processing unit 31 in this example) identified by the process unit identification information acquired in step SH4 (step SH5).

Next, the configuration processing unit 31 runs the change settings process based on the change command (step SH6).

The change settings process is a process that changes the content of the corresponding configuration data in the configuration settings database. As described above, the configuration settings database is a database relationally storing printer identification information and configuration data for the master printers 12 that connect to the control server 10.

In the change settings process, the configuration processing unit 31 accesses the configuration settings database. Next, the configuration processing unit 31 finds the corresponding record using the printer identification information contained in the change command as the search key. Next, the configuration processing unit 31 changes the values of the settings in the configuration data of the retrieved record to the values specified in the change command.

After executing the change settings process, the first configuration control data generated based on the configuration data is data reflecting the values changed based on the change command.

As described above, the content of the configuration data is changed based on a change command generated by the management device 14.

The change of configuration data based on the change command is reflected in the settings of the master printer 12 as described below at the timing described below, for example.

For example, when the configuration data is changed based on the change command, the configuration processing unit 31 of the control server 10 generates and outputs first configuration control data based on the new configuration data (the configuration data after being changed) to the corresponding master printer 12. Thus comprised, when the content of the configuration data changes, the change in the content of the configuration data can be more quickly reflected in the settings of the master printer 12.

When a request is received from one master printer 12, the configuration processing unit 31 of the control server 10 generates and outputs first configuration control data based on the configuration data related to the one master printer 12. In this event, the configuration processing unit 31 generates the first configuration control data based on the new configuration data when the content of the configuration data changes. The master printer 12 executes the configuration process based on the received first configuration control data. As a result, when one master printer 12 sends a request to the control server 10, the changed content of the configuration data is reflected in the settings of the one master printer 12.

The master printer 12 according to this embodiment is configured to send a request command when the power turns on. As a result, if there is a change in the content of the configuration data based on a change command before the power turns on, the changes to the content of the configuration data are reflected in the settings of the master printer 12 when the power turns on. Therefore, a process that changes the plural master printers 12 in the store system 11 of a particular store when the store opens for business is possible. Note that a configuration in which the master printer 12 sends a request at a regular interval after the power turns on is also conceivable.

The configuration processing unit 31 of the control server 10 may also execute the following process when a request is received.

More specifically, the configuration processing unit 31 manages the current values of the settings for each master printer 12 that connects to the control server 10. When a request is received from one master printer 12, the configuration processing unit 31 determines for each setting of the one master printer 12 if there is a difference between the value of the current setting in the one master printer 12, and the value indicated by the configuration data for the one master printer 12. If there is a change in the content of the configuration data based on a change command, the configuration processing unit 31 determines there is a difference.

Next, the configuration processing unit 31 generates first configuration control data specifying the new value and an instruction to set the specified value to the setting for which a difference was detected. Next, the configuration processing unit 31 outputs the generated first configuration control data. If the configuration processing unit 31 determines there are no settings for which the value was changed, it reports the same. This configuration minimizes the amount of first configuration control data and helps improve communication efficiency.

The operation of the management device 14, control server 10, and master printer 12 when the management device 14 controls the master printer 12 to print is described next.

Figure 11:
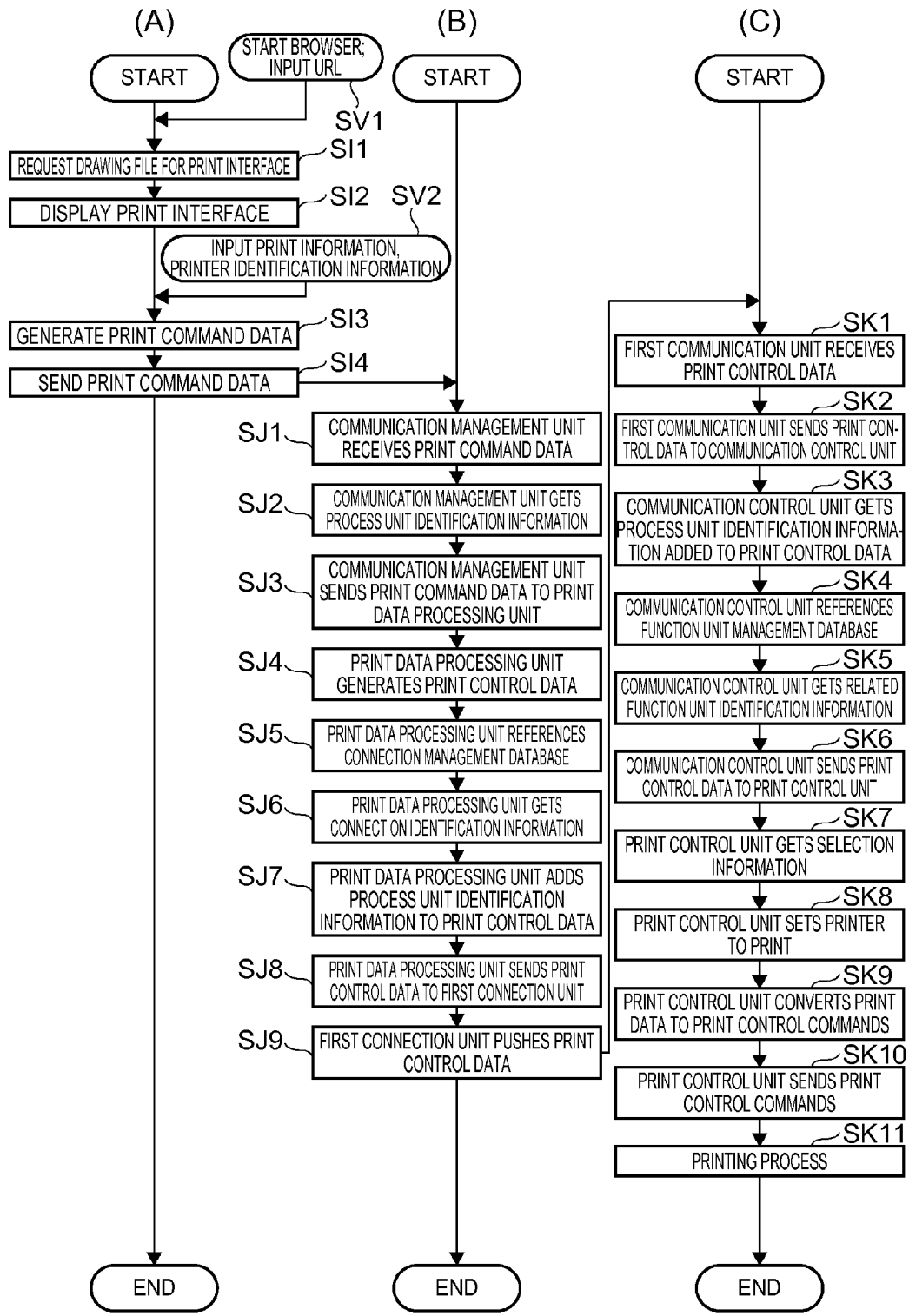
FIG. 11 is a flow chart showing the operation of devices in the print control system.

FIG. 11 is a flowchart showing the operation of the devices when the management device 14 controls printing by the master printer 12, (A) showing the operation the management device 14, (B) showing the operation of the control server 10, and (C) showing the operation of the master printer 12.

Using the flow chart in FIG. 11, asynchronous duplex communication through the first function unit communication path KT1 between the print data processing unit 27 of the control server 10 and the print control unit 17 of the master printer 12 is described using as an example the print data processing unit 27 sending data (print control data in this example).

As shown in FIG. 11 (A), to print from a master printer 12, the user first starts the browser on the management device 14, and inputs a command to access a specific URL (step SV1). This URL is the URL accessed to display a print information input interface (referred to below as the print interface) described below in the browser window. This specific URL is previously made known to the user. The URL may be a URL managed by the control server 10, or a URL managed by another server.

In response to the user instruction in step SV1, the browser execution unit 40a of the management device control unit 40 of the management device 14 accesses the specified URL, and requests the drawing file for displaying the print interface (step SI1). This drawing file is a file written in markup language such as HTML (HyperText Markup Language), and is a file for displaying a web page in a browser window on the management device 14.

Next, the browser execution unit 40a displays the print interface based on the drawing file acquired in response to the request of step SI1 (step SI2).

The print interface is a user interface for the user to input the print information to be printed by the master printer 12. The print information may include the name of a file storing image data, or information related to where to print the image on the print medium. Information the print data processing unit 27 of the control server 10 uses to generate print control data can be input through the print interface.

The print interface is a user interface to which the user inputs the printer identification information of the master printer 12 to use for printing. Fields for inputting the print information and printer identification information are provided in the print interface, and the user inputs the print information and printer identification information to the appropriate fields.

When the user has input the print information and printer identification information to the print interface and confirms input (step SV2), the browser execution unit 40a runs the following process.

The browser execution unit 40a then generates the print command data (step SI3). The print command data is data in a specific format containing the print information, printer identification information, and process unit identification information (the process unit identification information of the print data processing unit 27 in this example) based on the input to the print interface. The browser execution unit 40a manages the process unit identification information of the process unit (the print data processing unit 27 in this example) that is to process the print command data, and based thereon adds the process unit identification information of the print data processing unit 27 to the print command data. The configuration may enable the user to input the process unit identification information. The print command data is in a format enabling the print data processing unit 27 of the control server 10 to execute a process based on the data.

Next, the browser execution unit 40a controls the communication connection unit 41 and sends the print command data to the control server 10 (step SI4). In step SI4, the communication connection unit 41 opens a connection by a HTTP handshake with the control server 10, for example, and sends the print command data through the connection.

As shown in FIG. 11 (B), the communication management unit 25 controls the second connection unit 30 to receive the print command data (step SJ1).

Next, the communication management unit 25 acquires the process unit identification information contained in the print command data (step SJ2).

Next, the communication management unit 25 sends the print command data to the process unit (print data processing unit 27 in this example) identified by the process unit identification information acquired in step SJ2 (step SJ3). The communication management unit 25 manages the relationships between process unit and process unit identification information, and sends data to the process unit corresponding to the process unit identification information based on the value of the process unit identification information.

The print data processing unit 27 generates print control data based on the received print command data (step SJ4). The print control data is an XML (eXtensible Markup Language) file containing the print information to be printed by the master printer 12. The print control data includes the information to be printed by the master printer 12, including image data and information identifying the location of the images on the print medium, in XML format.

The printer identification information of the master printer 12 to use for printing is also written in the print control data. The print data processing unit 27 adds the printer identification information to the print control data based on the printer identification information contained in the print command data.

The print data processing unit 27 also adds selection information specifying which master printer 12 is the device that is to print (referred to below as "printer equipment selection information").

The print control data is data including a first control command in an XML-based command language (referred to below as "first command language").

The first command language of the print control data differs from the command language (referred to below as a second command language) of the print control commands described below. The print unit 18 of the master printer 12, and the print unit 61 of the slave printer 7, are compatible with the second command language, and can print based on control commands in the second command language.

The printer identification information and printer equipment selection information may be written in an area where control information is carried, such as the header of the print control data, or may be written in a specific tag in the print control data.

The print data processing unit 27 then accesses the connection management database stored in the control server storage unit 28 (step SJ5).

Next, the print data processing unit 27 acquires the connection identification information of the WebSocket connection CT related to the received identification information from the connection management database using the printer identification information as the search key (step SJ6). The connection identification information acquired here is the connection identification information of the WebSocket connection CT to the master printer 12 that is to print.

Next, the print data processing unit 27 adds the process unit identification information of the print data processing unit 27 to the print control data (step SJ7). The print data processing unit 27 manages the process unit identification information assigned to the print data processing unit 27.

Next, the print data processing unit 27 sends the print control data to the first connection unit 26 corresponding to the connection identification information acquired in step SJ6 (step SJ8).

The first connection unit 26 then pushes the received print control data through the WebSocket connection CT to the master printer (step SJ9).

As shown in FIG. 11 (C), the second communication unit 16 then receives the print control data through the WebSocket connection CT (step SK1).

Next, the second communication unit 16 sends the print control data to the communication control unit 15 (step SK2).

The communication control unit 15 then acquires the process unit identification information added to the print control data (step SK3). Next, the communication control unit 15 references the function unit management database (step SK4). Next, the communication control unit 15 gets the function unit identification information related to the process unit identification information from the function unit management database using the process unit identification information acquired in step SK3 as the search key (step SK5). Next, the communication control unit 15 sends the print control data to the function unit (the print control unit 17 in this example) identified by the function unit identification information acquired in step SK5 (step SK6).

The communication control unit 15 manages the relationships between function unit identification information and function units. The communication control unit 15 can therefore send data to a particular single function unit based on the function unit identification information.

Next, the print control unit 17 acquires the selection information added to the print control data (the printer equipment selection information specifying the master printer 12 in this example) (step SK7).

Next, based on the selection information acquired in step SK7, the print control unit 17 determines that the device that is to print is the master printer 12, and sets the master printer 12 as the device for printing (step SK8). In step SK8, the print control unit 17 determines the device that is to print is the master printer 12 when the selection information is information identifying the master printer 12, and when the selection information is information identifying a slave printer 7, determines the device that is to print is the slave printer 7.

The print control unit 17 then converts the received print control data to print control commands (print control data including second control commands) including control commands (second control commands) in the command language (second command language) of the print unit 18 (step SK9). More specifically, the print control unit 17b converts the print control data, which is an XML file, to commands in a second command language that can be interpreted by the print unit 18.

Next, the print control unit 17 sends the print control commands to the print unit 18 (step SK10). When the device that is to print is determined to be the master printer 12 based on the selection information, the print control unit 17 thus sends the print control commands to the print unit 18.

Next, the print unit 18 prints on the print medium based on the print control commands (step SK11). The print unit 18 uses the settings from the configuration file to print.

The control server 10 in this embodiment of the invention can thus send print control data to the master printer 12 and control the master printer 12 to print when there is a need to print with the master printer 12 without receiving a request from the master printer 12. Events that require the master printer 12 to print are events in which predefined conditions are met, such as when an instruction is received from the user, or a request is received from a communicatively connected external device, as described above.

This configuration also enables starting printing faster when an event requiring printing occurs than in a configuration in which the master printer 12 intermittently sends a request to the control server 10, and the control server 10 sends print control data in response to such a request. Consumption of resources can also be suppressed compared with a configuration in which the control server 10 queues responses to requests.

After printing by the print unit 18, the master printer 12, control server 10, and management device 14 execute the following process.

The print control unit 17 generates first print result data based on the result of printing by the print unit 18. The first print result data is data indicating, for example, if printing by the print unit 18 was successful or failed, and the cause of the failure if printing fails.

The print control unit 17 sends the first print result data to the print data processing unit 27 through the first function unit communication path KT1 of the WebSocket connection CT. Sending data from the print control unit 17 to the print data processing unit 27 using the first function unit communication path KT1 is done using the same method as sending data from the configuration control unit 23 to the configuration processing unit 31 using the second function unit communication path KT2.

The print data processing unit 27 executes an appropriate process based on the received first print result data. For example, if there is a display unit or speaker, the print data processing unit 27 controls the appropriate device to report the print result to the user. Further alternatively, the print data processing unit 27 may relationally store the first print result data, or data based on the first print result data, with information indicating time, in the control server storage unit 28. The information represented by the stored data can be used, for example, to analyze transactions in a business, such as analyzing issuance of receipts at different times of day, or to analyze if a problem has occurred with the master printer 12.

The print data processing unit 27 then sends the received first print result data to the management device 14 that sent the print command data. For example, the print data processing unit 27 manages the connection used to receive the print command data, and sends the first print result data to the management device 14 using this connection. The browser execution unit 40a of the management device control unit 40 of the management device 14 runs a corresponding process based on the received first print result data. For example, the management device control unit 40 may execute a process that displays information representing the print result on the display unit 42 and reports the print result to the user.

In this embodiment of the invention the control server 10 has process units with different functions, such as the print data processing unit 27 and the configuration processing unit 31.

The effect of this is described below.

That is, as described above, when the print data processing unit 27 receives print result data, it sends the received print result data to the management device 14 that sent the print command data. As a result, the management device 14 that instructed printing can get the result of printing. When a request is received from the master printer 12, the configuration processing unit 31 generates and outputs first configuration control data to the master printer 12.

The method of processing received data differs for the print data processing unit 27 and the configuration processing unit 31, particularly how to handle the data in relation to the management device 14. Based on this, the control server 10 has a configuration processing unit 31 as a process unit separate from the print data processing unit 27. Note that with this method, data sent by the print control unit 17 is sent to the print data processing unit 27, and data sent by the configuration control unit 23 is sent to the configuration processing unit 31.

The operation of the management device 14, control server 10, master printer 12, and slave printer 7 when the management device 14 controls printing by the slave printer 7 is described next.

Figure 12:
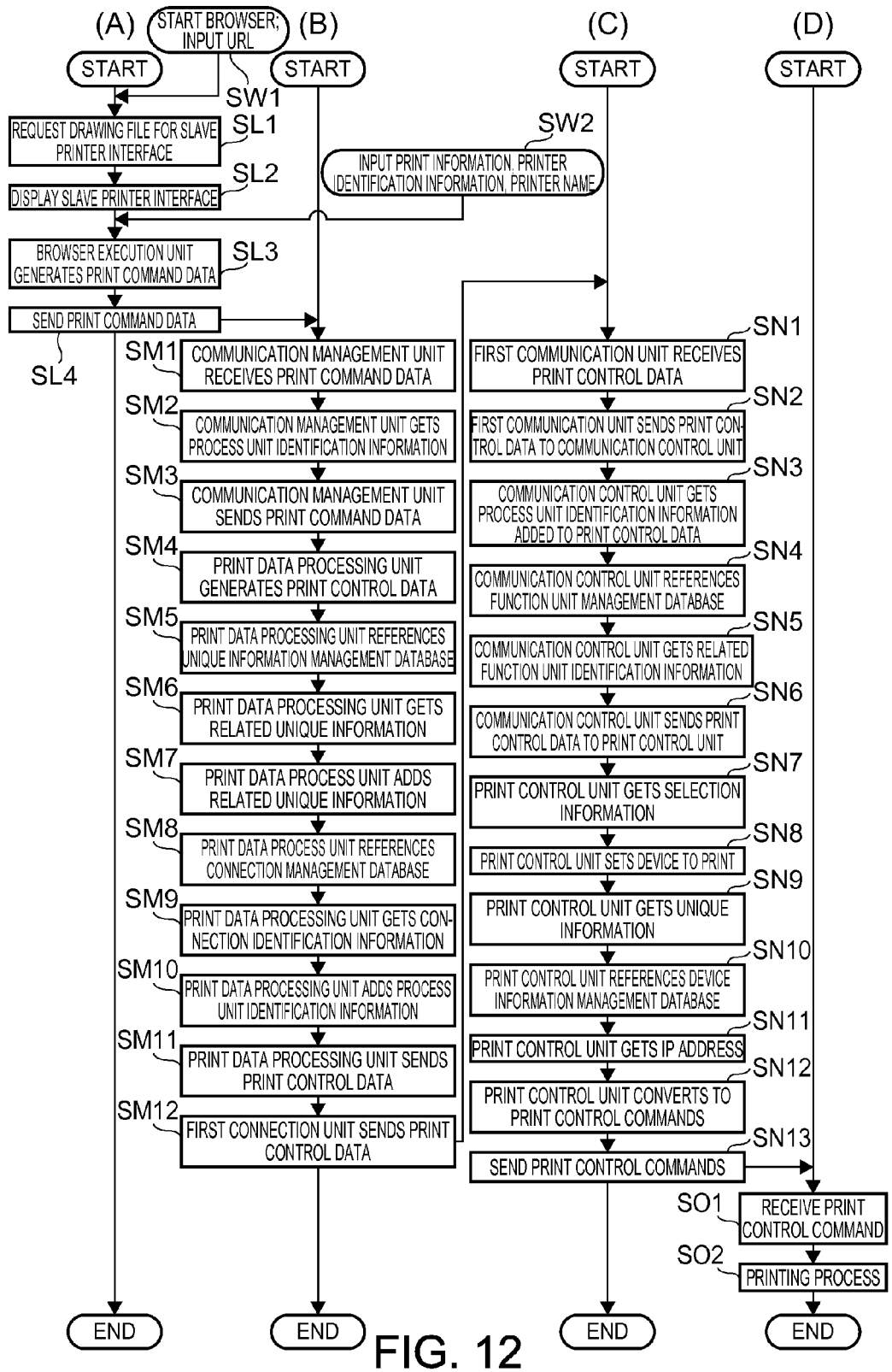
FIG. 12 is a flow chart showing the operation of devices in the print control system.

FIG. 12 is a flowchart showing the operation of the devices when the management device 14 controls printing by a slave printer 7, (A) showing the operation the management device 14, (B) showing the operation of the control server 10, (C) showing the operation of the master printer 12, and (D) showing the operation of the slave printer 7.

As shown in FIG. 12 (A), to print from a slave printer 7, the user first starts the browser on the management device 14, and inputs a command to access a specific URL (step SW1). This URL is the URL accessed to display a slave printer interface (referred to below as the slave printer interface) described below in the browser window. This specific URL is previously made known to the user. The URL may be a URL managed by the control server 10, or a URL managed by another server.

In response to the user instruction in step SW1, the browser execution unit 40a of the management device control unit 40 of the management device 14 accesses the specified URL, and requests the drawing file for displaying the slave printer interface (step SL1).

Next, the browser execution unit 40a displays the slave printer interface based on the drawing file acquired in response to the request of step SL1 (step SL2).

The slave printer interface is a user interface for the user to input the print information to be printed by the slave printer 7. The print information may include the name of a file storing image data, or information related to where to print the image on the print medium.

The slave printer interface is a user interface to which the user inputs the printer identification information of the master printer 12 connected through the local area network LN to the slave printer 7 to use for printing, and the device name (printer name) of the slave printer 7 to print on the local area network LN. Fields for inputting the print information, the printer identification information, and the printer name are provided in the slave printer interface, and the user inputs the print information, the printer identification information, and the printer name to the appropriate fields.

When the user has input the print information, the printer identification information, and the printer name to the slave printer interface and confirms input (step SW2), the browser execution unit 40a runs the following process.

The browser execution unit 40a first generates the print command data (step SL3).

The print command data the browser execution unit 40*a* generates in step SL3 is data including the the print information, the printer identification information, and the printer name based on the information input to the slave printer interface, and includes process unit identification information for the process unit that is to process the print command data. In this example the process unit identification information is the process unit identification information of the print data processing unit 27. The browser execution unit 40*a* manages the process unit identification information of the process unit (the print data processing unit 27 in this example) that is to process the print command data, and based thereon adds the process unit identification information of the print data processing unit 27 to the print command data. The configuration may enable the user to input the process unit identification information. The print command data is in a format enabling the print data processing unit 27 of the control server 10 to execute a process based on the data.

Next, the browser execution unit 40*a* controls the communication connection unit 41 and sends the print command data to the control server 10 (step SL4). In step SL4, the communication connection unit 41 opens a connection by a HTTP handshake with the control server 10, for example, and sends the print command data through the connection.

As shown in FIG. 12 (B), the communication management unit 25 of the control server 10 controls the second connection unit 30 to receive the print command data (step SM1).

Next, the communication management unit 25 acquires the process unit identification information contained in the print command data (step SM2).

Next, the communication management unit 25 sends the print command data to the process unit (print data processing unit 27 in this example) identified by the process unit identification information acquired in step SM2 (step SM3). The communication management unit 25 manages the relationships between process unit and process unit identification information, and sends data to the process unit corresponding to the process unit identification information based on the value of the process unit identification information.

The print data processing unit 27 generates print control data based on the received print command data (step SM4). As described above, the print control data is data in an XML-based first command language, and includes first control commands in the first command language.

Based on the printer identification information contained in the print command data, the print data processing unit 27 adds printer identification information to the print control data in step SM4.

Also in step SM4, the print data processing unit 27 adds selection information (referred to below as printer device selection information) specifying the slave printer 7 that is to print. In this embodiment, if the printer name of the slave printer 7 is contained in the print command data, the print data processing unit 27 adds the printer device selection information to the print control data. If the printer name is not included in the print command data, the print data processing unit 27 includes the printer equipment selection information described above in the print control data. A configuration that includes information whether to print with the slave printer or the master printer in the header of the print command data, and the print data processing unit 27 determines whether to print with the slave printer or to print with the master printer based on the header information is also conceivable.

Further alternatively, the printer identification information and printer device selection information may be written in an area where control information is written, such as the header of the print control data, or written in a specific tag in the print control data.

Next, the print data processing unit 27 references the unique information management database stored by the control server storage unit 28 (step SM5). As described above, the unique information management database is a database that relationally stores the printer identification information, unique information identifying the slave printers 7 (the MAC address in this example), configuration content information, and printer names.

Next, using the printer identification information and printer name combination contained in the print command data as the search key, the print data processing unit 27 searches the unique information management database to get the unique information related to the search key (step SM6).

Next, the print data processing unit 27 adds the unique information to the generated print control data (step SM7).

Next, the print data processing unit 27 references the connection management database stored in the control server storage unit 28 (step SM8).

Next, the print data processing unit 27 acquires the connection identification information of the WebSocket connection CT related to the received identification information from the connection management database using the printer identification information as the search key (step SM9). The connection identification information acquired here is the connection identification information of the WebSocket connection CT to the master printer 12 that is to print.

Next, the print data processing unit 27 adds the process unit identification information of the print data processing unit 27 to the print control data (step SM10). The print data processing unit 27 manages the process unit identification information assigned to the print data processing unit 27.

Next, the print data processing unit 27 sends the print control data to the first connection unit 26 corresponding to the connection identification information acquired in step SM9 (step SM11).

The first connection unit 26 then pushes the received print control data through the WebSocket connection CT to the master printer (step SM12).

As shown in FIG. 12 (C), the second communication unit 16 then receives the print control data through the WebSocket connection CT (step SN1).

Next, the second communication unit 16 sends the print control data to the communication control unit 15 (step SN2).

The communication control unit 15 then acquires the process unit identification information added to the print control data (step SN3).

Next, the communication control unit 15 references the function unit management database (step SN4). Next, the communication control unit 15 gets the function unit identification information related to the process unit identification information from the function unit management database using the process unit identification information acquired in step SN3 as the search key (step SN5). Next, the communication control unit 15 sends the print control data to the function unit (the print control unit 17 in this example) identified by the function unit identification information acquired in step SN5 (step SN6).

The communication control unit 15 manages the relationships between function unit identification information and function units. The communication control unit 15 can therefore send data to a particular single function unit based on the function unit identification information.

Next, the print control unit 17 acquires the selection information added to the print control data (the printer selection information specifying a slave printer 7 in this example) (step SN7).

Next, based on the selection information acquired in step SN7, the print control unit 17 determines that the device that is to print is the slave printer 7, and sets the slave printer 7 as the device for printing (step SN8). In step SN8, the print control unit 17 determines the device that is to print is the master printer 12 when the selection information is information identifying the master printer 12, and when the selection information is information identifying a slave printer 7, determines the device that is to print is the slave printer 7.

Next, the print control unit 17 gets the unique information added to the print control data (step SN9). In this example, the unique information is the MAC address of the slave printer 7 that is to print.

Next, the print control unit 17 references the device information management database stored by the printer storage unit 19 (step SN10). As described above, the device information management database is a database that relationally stores the unique information to the configuration content information (including the IP address).

Next, using the unique information acquired in step SN9 as the search key, the print control unit 17 acquires the configuration content information related to the unique information from the device information management database, and gets the IP address contained in the acquired configuration content information (step SN11).

The print control unit 17 then converts the received print control data to print control commands (print control data including second control commands) including control commands (second control commands) in the command language (second command language) of the print unit 61 (step SN12). More specifically, the print control unit 17*b* converts the print control data, which is an XML file, to commands in a second command language that can be interpreted by the print unit 61.

Next, the print control unit 17 controls the first communication unit 24 to send the print control commands to the slave printer 7 of the IP address acquired in step SN11 (step SN13).

As shown in FIG. 12 (D), the device control unit 7S of the slave printer 7 then controls the communication interface 63 to receive the print control commands (step S01).

Next, the device control unit 7S controls the print unit 61 to print based on the print control commands.

As described above, the management device 14 in this embodiment of the invention can use functions of the control server 10 to print to a specific slave printer 7 through the control server 10 and the master printer 12.

In this embodiment of the invention, the master printer 12 has a function for converting print control data in a first command language generated by the control server 10 (print control data including first control commands compatible with a first command language) to print control commands in a second command language (print control data including second control commands compatible with the second command language), and the slave printer 7 does not need to have this function. It is therefore not necessary to provide the slave printers 7 with this function to use the services of the control server 10, building the system is therefore simple, and the cost required to build the system can be suppressed.

After printing by the print unit 61 of the slave printer 7, the slave printer 7, master printer 12, control server 10, and management device 14 execute the following process.

That is, the device control unit 7S of the slave printer 7 generates second print result data based on the result of printing by the print unit 61. The second print result data is data indicating, for example, if printing by the print unit 61 was successful or failed, and the cause of the failure if printing fails.

Next, the device control unit 7S sends the second print result data to the print control unit 17 of the master printer 12. The print control unit 17 sends the second print result data to the print data processing unit 27 of the control server 10 through the first function unit communication path KT1 of the WebSocket connection CT.

The print data processing unit 27 executes an appropriate process based on the received second print result data. For example, if there is a display unit or speaker, the print data processing unit 27 controls the appropriate device to report the print result to the user. Further alternatively, the print data processing unit 27 may relationally store the second print result data, or data based on the second print result data, with information indicating time, in the control server storage unit 28. The information represented by the stored data can be used, for example, to analyze transactions in a business, such as analyzing issuance of receipts at different times of day, or to analyze if a problem has occurred with a slave printer 7.

The print data processing unit 27 then sends the received second print result data to the management device 14 that sent the print command data. For example, the print data processing unit 27 manages the connection used to receive the print command data, and sends the second print result data to the management device 14 using this connection. The browser execution unit 40*a* of the management device control unit 40 of the management device 14 runs a corresponding process based on the received second print result data. For example, the management device control unit 40 may execute a process that displays information representing the print result on the display unit 42 and reports the print result to the user.

As described above, the print control system 1 according to this embodiment has a slave printer 7 (first printer), a master printer 12 (a second printer), and a control server 10 (print control server).

The slave printer 7 has a print unit 61 (first print unit) that prints.

The master printer 12 has a print unit 18 (second print unit) that prints, and communicates with the slave printer 7 over a local area network LN (first network).

The control server 10 connects to the master printer 12 over another network GN (second network), and sends configuration control data to the master printer 12. The configuration control data includes model information (attribute information) identifying the model (attribute) of the slave printer 7, and is used by the slave printer 7 to run a configuration process.

Thus comprised, the control server 10 sends the configuration control data including attribute information of a slave printer 7 and causing the slave printer 7 to run a configuration process to the master printer 12. Based on the attribute information contained in the configuration control data, the master printer 12 can control the slave printer 7 corresponding to the attribute information to execute the configuration process based on the configuration control data. The control server 10 can therefore cause a printing device of a specific attribute to execute a configuration process using a construction enabling the master printer 12 and control server 10 to communicate over one network GN, and a construction enabling the master printer 12 and the slave printer 7 to communicate over a local area network LN.

When the master printer 12 in this embodiment receives configuration control data, it sends the configuration control data to a slave printer 7 based on the model information contained in the configuration control data, and the slave printer 7 then executes the configuration process based on the received configuration control data.

Thus comprised, based on attribute information contained in the received configuration control data, the master printer 12 can send configuration control data to the slave printer 7 corresponding to the attribute information, and can cause the slave printer 7 to execute the configuration process.

The master printer 12 in this embodiment of the invention can also query the slave printers 7 for model information, and based on the response to the query can select the slave printer 7 to which to send the configuration control data.

Thus comprised, the master printer 12 can select the slave printers 7 matching the model information specified by the control server 10 from among the slave printers 7 connected to the local area network LN.

After completing the configuration process based on the received configuration control data, the slave printer 7 in this embodiment of the invention sends specific information (the MAC address in this example) uniquely assigned to the slave printer 7 to the master printer 12. The master printer 12 stores and sends to the control server 10 the unique information received for each slave printer 7. The control server 10 relationally stores the unique information received for a slave printer 7 with information related to the settings made in the configuration process.

Thus comprised, the control server 10 can use the unique information to manage the slave printers 7 connected to the local area network LN, and to control one slave printer 7 to execute a process, can specify and cause the one slave printer 7 to execute the process using the unique information. Based on the unique information, the control server 10 can also manage information related to the settings of a slave printer 7.

When sending print control data (control data) causing a slave printer 7 of the stored unique information to print (process), the control server 10 in this embodiment of the invention adds the unique information to the print control data sent to the master printer 12.

Using the unique information, the print control server in this configuration can control a specific slave printer 7 in the group of plural slave printers 7 connected to the local area network LN to execute a desired process.

When the configuration process is completed, the slave printer 7 also prints information about the content of the settings made in the configuration process with the print unit 61.

Thus comprised, the user can know which slave printers 7 have been configured as controlled by the control server 10, and can know the content of the settings that were set in the slave printer 7, by referring to the printout from the slave printer 7.

The invention is described above with reference to a preferred embodiment thereof, but the invention is not limited thereto and can be modified and adapted in many ways without departing from the scope of the accompanying claims.

In the embodiment described above the master printer 12 is installed as part of a store system 11 deployed in a business. However, the master printer 12 is not limited to being part of a store system 11, and may be used in other systems.

The function blocks shown in FIG. 3 can also be rendered as desired using hardware and software, and do not suggest a specific hardware configuration. Functions of the master printer 12 may also be rendered by a separate externally connected device. The master printer 12 can also execute the processes described above by running a program stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer comprising:
a first communicator configured to communicate with one or more other printers through a first network;
a second communicator configured to receive configuration control data from a print control server, through a second network, the configuration control data including attribute information identifying at least one printer from among the one or more other printers; and
a configuration controller configured to send the configuration control data to the at least one printer identified by the attribute information, the configuration controller sending the configuration control data by controlling the first communicator.

2. The printer of claim 1 wherein the configuration controller configured to query the one or more other printers for the attribute information identifying the at least one printer and identify the at least one printer for sending the configuration control data based on query responses received from the one or more other printers.

3. The printer of claim 1 wherein the configuration controller is configured to forward unique information, specifically assigned to the at least one printer identified by the attribute information, to the print control server for storage.

4. In a communications network comprising a printer, one or more other printers connected to the printer via a first network, and a print control server connected to the printer via a second network, a method for configuring the other printers, the method comprising:
receiving configuration control data, the configuration control data including attribute information identifying at least one printer from among the one or more other printers; and
sending the configuration control data to the at least one printer identified by the attribute information.

5. The method of claim 4 further comprising:
querying the one or more other printers for the attribute information identifying the at least one printer; and
identifying the at least one printer for sending the configuration control data based on query responses received from the one or more other printers.

6. The method of claim 4 further comprising:
receiving unique information specifically assigned to the at least one printer identified by the attribute information; and forwarding the unique information to the print control server for storage.

\* \* \* \* \*